US009193458B2

(12) United States Patent
Pongratz et al.

(10) Patent No.: US 9,193,458 B2
(45) Date of Patent: Nov. 24, 2015

(54) AIR-TO-SURFACE SURVEILLANCE AND/OR WEAPONS SYSTEM AND METHOD FOR AIR-BASED INSPECTION AND/OR ENGAGEMENT OF OBJECTS ON LAND OR SEA

(71) Applicant: EADS Deutschland GmbH, Ottobrunn (DE)

(72) Inventors: Hans Wolfgang Pongratz, Taufkirchen (DE); Manfred Hiebl, Neuburg a.d. Donau (DE)

(73) Assignee: EADS Deutschland GmbH, Ottobrunn (DE)

( * ) Notice: Subject to any disclaimer, the term of this patent is extended or adjusted under 35 U.S.C. 154(b) by 174 days.

(21) Appl. No.: 13/757,037

(22) Filed: Feb. 1, 2013

(65) Prior Publication Data

US 2013/0200207 A1 Aug. 8, 2013

(30) Foreign Application Priority Data

Feb. 3, 2012 (DE) .......................... 10 2012 002 067

(51) Int. Cl.
| | |
|---|---|
| B64C 37/02 | (2006.01) |
| B64C 3/00 | (2006.01) |
| B64C 39/02 | (2006.01) |

(52) U.S. Cl.
CPC ............... *B64C 37/02* (2013.01); *B64C 39/024* (2013.01)

(58) Field of Classification Search
CPC .. B64C 3/00; B64C 37/02; B64C 2700/6233; B64D 5/00
USPC ........... 244/2, 5, 123.1, 123.14, 123.8, 123.9, 244/137.4
See application file for complete search history.

(56) References Cited

U.S. PATENT DOCUMENTS

| | | | | |
|---|---|---|---|---|
| 2,780,422 | A | * | 2/1957 | Maglio, Jr. .......................... 244/2 |
| 2,876,677 | A | * | 3/1959 | Clark et al. ..................... 89/1.51 |
| 3,443,776 | A | * | 5/1969 | Moore ................................ 244/5 |
| 5,518,205 | A | | 5/1996 | Wurst et al. |
| 5,810,284 | A | * | 9/1998 | Hibbs et al. ...................... 244/13 |
| 5,969,686 | A | * | 10/1999 | Mackenzie ..................... 343/705 |
| 6,129,308 | A | * | 10/2000 | Nastasi et al. .................. 244/36 |
| 6,439,048 | B1 | * | 8/2002 | Hui et al. ......................... 73/181 |
| 6,540,179 | B2 | * | 4/2003 | Henderson ................ 244/135 A |
| 6,959,686 | B2 | * | 11/2005 | Lee .................................. 123/305 |
| 7,341,224 | B1 | | 3/2008 | Osann, Jr. |
| 7,766,274 | B1 | * | 8/2010 | Jameson et al. ........... 244/17.11 |
| 8,528,853 | B2 | * | 9/2013 | Luther .............................. 244/2 |
| 8,668,161 | B2 | * | 3/2014 | Heppe ............................... 244/2 |
| 2003/0213868 | A1 | * | 11/2003 | Brunner et al. ............. 244/3.16 |

(Continued)

FOREIGN PATENT DOCUMENTS

| | | |
|---|---|---|
| GB | 2 451 583 A | 2/2009 |
| WO | WO 00/54433 A1 | 9/2000 |

*Primary Examiner* — Tien Dinh
*Assistant Examiner* — Michael Wang
(74) *Attorney, Agent, or Firm* — Crowell & Moring LLP

(57) ABSTRACT

An air-to-surface surveillance and/or weapons system includes a base aircraft and an unmanned slave aircraft that can be uncoupled from a base aircraft and coupled back to it again. The base aircraft and slave aircraft are equipped with coupling equipment designed to work together. The base aircraft is equipped with surveillance and monitoring equipment. The slave aircraft is equipped with monitoring equipment and/or weapons. The slave aircraft can be connected to a control station via a data link for data exchange and can be controlled from this control station.

20 Claims, 13 Drawing Sheets

(56) References Cited

U.S. PATENT DOCUMENTS

| | | | |
|---|---|---|---|
| 2005/0134496 A1* | 6/2005 | Trainor | 342/14 |
| 2007/0102565 A1* | 5/2007 | Speer et al. | 244/2 |
| 2008/0012751 A1* | 1/2008 | Owens et al. | 342/62 |
| 2008/0185475 A1* | 8/2008 | Fuller | 244/5 |
| 2008/0297644 A1* | 12/2008 | Farchtchian et al. | 348/340 |
| 2009/0206196 A1 | 8/2009 | Parks et al. | |
| 2009/0278929 A1* | 11/2009 | Lagadinos et al. | 348/143 |
| 2009/0294573 A1* | 12/2009 | Wilson et al. | 244/2 |
| 2010/0084511 A1* | 4/2010 | Roberts et al. | 244/135 A |
| 2011/0049288 A1* | 3/2011 | Suzuki | 244/2 |

* cited by examiner

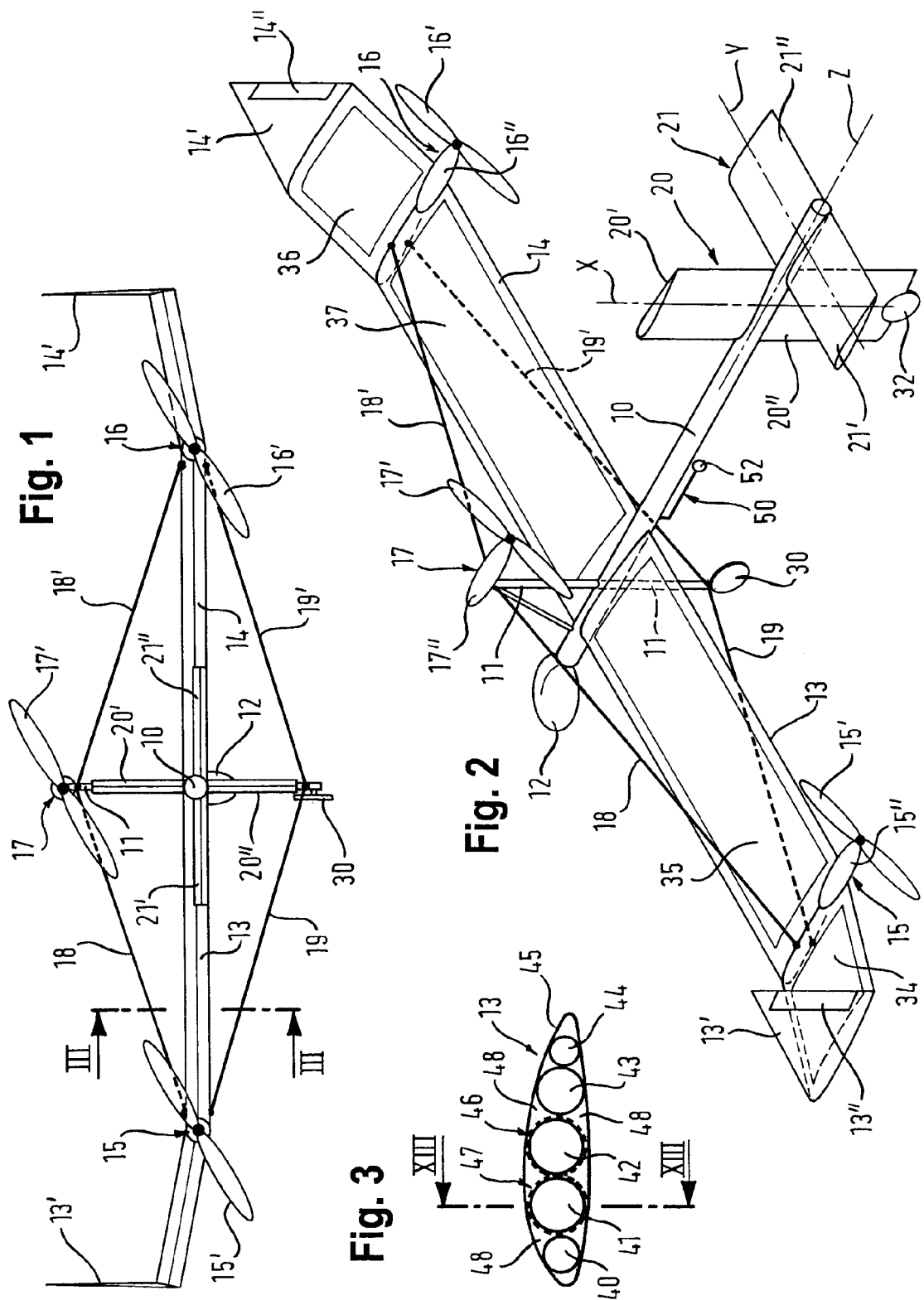

AIR-TO-SURFACE SURVEILLANCE AND/OR WEAPONS SYSTEM AND METHOD FOR AIR-BASED INSPECTION AND/OR ENGAGEMENT OF OBJECTS ON LAND OR SEA

CROSS-REFERENCE TO RELATED APPLICATIONS

The present application claims priority under 35 U.S.C. §119 to German Patent Application No. 10 2012 002 067.8, filed Feb. 3, 2012, the entire disclosure of which is herein expressly incorporated by reference.

TECHNICAL FIELD

Exemplary embodiments of the present invention relate to an air-to-surface surveillance and/or weapons system having a base aircraft and at least one unmanned slave aircraft that can be uncoupled from at least one base aircraft and then coupled back to it. The invention also relates to a method for air-based inspection and/or engagement of objects on land or sea by means of such a system.

Such a system, which is comprised of a plurality of cooperating unmanned long-term surveillance aircraft, i.e., drones, is particularly suitable for anti-terror use over land and for protection of ships from pirate raids at sea. By employing a fleet of drones according to the invention, it is possible to efficiently conduct surveillance of overland routes and maritime shipping routes, in particular when these drones are equipped with solar drives. Using the system according to the invention, armed protection against attacks on overland routes and pirate attacks on the maritime shipping routes can be offered to people and vehicles using these routes.

BACKGROUND OF THE INVENTION

To be able to protect unarmed merchant ships from attack by pirates, for example, the risk of an imminent pirate attack must first be promptly detected. Then auxiliary forces equipped with suitable weapons and capable of intervening quickly at the site of the attack are successfully deployed to ward off the attack before the pirates can board the at-risk ship and take the crew hostage.

To promptly detect an imminent pirate attack, for example, it is first necessary to observe and conduct surveillance of the at-risk ships that are to be protected and the maritime shipping route. A distinction is to be made between two possible deployment scenarios, namely a first deployment scenario in which a convoy of ships traveling on a maritime shipping route is monitored, such that the surveillance equipment travels with the convoy, and a second deployment scenario in which an entire maritime shipping route is monitored by a plurality of quasi-stationary surveillance units, and ships traveling on the maritime shipping route go from one surveillance area into the next surveillance area.

To ward off a pirate attack detected as part of this surveillance on a ship that is to be protected, combat means should be available in proximity to the respective surveillance area, the combat means being ready for deployment immediately after detection of a pirate attack and being able to thwart a pirate attack even before the pirates seek to board the ship to be protected.

STATE OF THE ART

According to current state of the art, the task of defending against pirates is accomplished at enormous expense through battleships of frigate size or destroyers with on-board helicopters and with the help of land-based maritime patrol aircraft. Because of the limited range of the on-board sensors of the ships and the limited lifetime of the maritime patrol aircraft and on-board helicopters and the extremely complex and restrictive rules of engagement, the sea routes around the Horn of Africa can be monitored only in spots, and thus pirate attacks cannot be adequately prevented even with a fleet of 50 ships and several maritime patrol aircraft.

SUMMARY OF THE INVENTION

Exemplary embodiments of the present invention provide a surveillance system and/or a weapons system as well as a method for inspection and/or engagement of objects on land or at sea by means of such a system, which permits large-area surveillance of overland routes or maritime shipping routes, on the one hand, and on the other hand, ensures a quick response in cases when a threat is detected.

The air-to-surface surveillance system and/or weapons system according to exemplary embodiments of the present invention includes at least one base aircraft and at least one unmanned slave aircraft that can be uncoupled from the base aircraft and coupled to it again. Therefore, the base aircraft and the slave aircraft are equipped with coupling means which are designed to work together mutually. Furthermore, the base aircraft is equipped with surveillance and observation means and the slave aircraft is equipped with observation and/or weapon means. The slave aircraft can be connected via a data link to a control station on the ground, for example, for data exchange and can be controlled by it.

The air-to-surface surveillance and/or weapons system according to the invention makes it possible in a particularly advantageous manner to monitor and secure traffic routes over land and at sea, even if there are no available ground stations along or in the vicinity of the traffic routes.

The base aircraft is also preferably unmanned and can be connected to and controlled by the control station over another data link. Therefore both the base aircraft and the slave aircraft can be remote-controlled by the control station in a known way.

Another advantageous embodiment involves providing the base aircraft and/or the slave aircraft with a fuselage and with at least one wing, which creates aerodynamic lift, and the respective wing comprises a plurality of wing spars and tubes, which extend in one direction across the longitudinal axis of the fuselage, preferably at a right angle, and which are surrounded by a skin that forms a wing covering, the skin determining the cross-sectional contour of the wing, such that the cross-sectional contour forms a laminar profile, which creates a high buoyancy with a low flow resistance. This wing is characterized by its extremely low weight because it maintains its stiffness in the direction of the wing span from one or more tubes filled with compressed gas. Thus, for example, several tubes filled with compressed gas may run in the direction of the wing span, having different diameters and being interconnected and surrounded by a shared outer shell, so that a wing with a profile that creates aerodynamic lift is achieved with this design. If a gas lighter than air, e.g., hydrogen or helium is used as the compressed gas for filling the tubes, then the wing has an aerostatic lift component as well as an aerodynamic lift component in the presence of a suitable oncoming flow.

Providing a bracing of the free ends of the wing against the fuselage or against an engine pod provided beneath the fuselage ensures that the wing cannot bend upward under the force of the buoyancy acting on it. In addition to the guy wires provided on the free ends of the wing, additional guy wires may be attached to the wing between the respective free end of the wing and its attachment to the fuselage, and these guy wires are then also braced against the fuselage and/or against a pod provided beneath the fuselage.

It is advantageous if at least some of the tubes in the wing can be filled with hydrogen and if at least some of the tubes in the wing can be filled with oxygen. Then the tubes not only serve to reinforce the wing but also serve as storage reservoirs for the hydrogen and oxygen, which are the components of the propellant.

The fuselage of the base aircraft and/or of the slave aircraft advantageously has a shell that is filled at least partially with a buoyant gas that is different from air and is lighter than air, in particular hydrogen. Therefore the fuselage can act as a buoyancy body.

In another preferred embodiment the base aircraft and the slave aircraft each have at least one drive equipped with a propeller, preferably having an electrically driven drive motor, which is preferably mounted in an engine pod provided beneath the fuselage or on the wing.

This engine pod is connected to the fuselage and optionally also to the payload pod by supporting elements that may, for example, be formed by guy wires. This separate arrangement of drive in an independent engine pod ensures that vibrations emanating from the drive are not transferred to the fuselage of the aircraft and optionally also to the payload pod, so that, for example, instruments present in the payload pod are not exposed to any vibrations emanating from the drive. An electric drive motor has proven to be especially suitable.

It is also advantageous if the skin of the wing cover of the base aircraft and/or of the slave aircraft is transparent on the top side of the wing, and if the top side of the wing is equipped with solar cells of a solar generator mounted between the transparent skin and the tubes.

With this wing, which is designed as an extremely lightweight construction, it is especially advantageous if the wing has a shell with an aerodynamic shape in the longitudinal section, made of a thin transparent film, preferably a transparent polyester film on the top side of the wing and an ultra-strong aramid film with a sputtered aluminum coating to protect against UV radiation on the underside of the wing. MYLAR® is the brand name of a transparent, biaxially oriented polyester film that is available on the market and is especially suitable because of its strength. Thin-film solar cells of the CIGS type (copper indium gallium selenide) are advantageously mounted beneath the transparent polyester film over the entire top side of the wing and the top side of the horizontal tail; these solar cells are advantageously applied to a thin film of polyimide (e.g., KAPTON® film) and covered with another film, so that the entire structure advantageously is only approximately 50 µm thick and therefore is very light and achieves an efficiency of up to 16%. Such thin-film CIGS solar cells have a very low weight and still operate well even without separate cooling systems at elevated temperatures, such as those which can occur at high altitudes, so that a very lightweight solar generator is formed when combined with the carrier element formed from a thin-film.

An embodiment of the system according to the invention, in which a photovoltaic power supply device is provided in the base aircraft to generate the drive energy is especially efficient, having at least one photovoltaic solar generator, which converts solar radiation into electrical energy; at least one hydrogen generator for generating hydrogen from water; at least one hydrogen storage tank, which is connected to the hydrogen generator by a first water line; at least one water storage tank, preferably formed by the first chamber and connected to the hydrogen generator by a first hydrogen line; at least one fuel cell connected to the hydrogen storage tank by a second hydrogen line and connected to the water storage tank by a second water line; and a control unit, which is electrically connected to the solar generator, the hydrogen generator and the fuel cell. The drive energy for the electric drive motor and also for other electrical consumers of the aircraft and its payload is thus preferably supplied by means of this photovoltaic power supply system.

Providing a photovoltaic solar generator, a hydrogen generator and a fuel cell in parallel in this power supply system makes it possible to use a portion of the electric energy generated by the solar generator for generating hydrogen from water during the day, when sufficient solar energy is available, and then at night when no solar energy is available or when not enough solar energy is available, this hydrogen is recombined with ambient oxygen to form water in the fuel cell to generate electric energy by means of the fuel cell. Electric energy is therefore always available in this way.

It is thus advantageous if the control unit is designed to supply the electric energy generated by the solar generator to an electric consumer connection of the power supply system when radiant solar energy is available, and when radiant solar energy is not available or when the electric energy generated by the solar generator is not sufficient for a given energy demand, the control unit activates the fuel cell to supply electric energy to the consumer connection. This control unit thus ensures that the fuel cell is automatically activated when little or no solar energy is available.

It is also advantageous if the control unit is designed so that it supplies some of the electric energy generated by the solar generator to the hydrogen generator when solar energy is available and it supplies water from the water storage tank to the hydrogen generator, so that the hydrogen generator is activated to generate hydrogen from the water supplied to it, which is then stored in the hydrogen storage tank. With this embodiment, a portion of the electric energy generated by the solar generator is always used to operate the hydrogen generator to generate the hydrogen needed by the fuel cell to generate electric energy when the solar generator is supplying little or no electric energy. The control unit can control the amount of electric energy supplied to the hydrogen generator or the on-times of the hydrogen generator as a function of the available hydrogen supply.

The coupling means preferably have a tank filling connection means with which fuel can be delivered from the base aircraft to the slave aircraft. In this way, the slave aircraft can be refueled with the fuel produced in the base aircraft for its next mission, when it is coupled to the base aircraft.

The slave aircraft is preferably capable of hovering and is therefore provided with buoyancy bodies, which are filled with a gas that is lighter than air. This embodiment improves the observation properties of the slave aircraft because it can therefore be positioned in a quasi-stationary position above an object that is to be observed or inspected.

It is especially advantageous if the gas that is lighter than air is hydrogen, which is stored in at least one hydrogen storage tank in the slave aircraft and at the same time is provided as a fuel for an aircraft drive. The hydrogen required as a fuel is thus used as a buoyancy medium at the same time.

The slave aircraft preferably has vertical takeoff and landing (VTOL) capabilities. These properties make it possible for the slave aircraft to land on the deck of a ship to be inspected, for example.

This system is especially suitable if the base aircraft has at least one surveillance radar unit directed down toward the earth's surface. This surveillance radar unit makes the slave aircraft suitable for night deployment.

If the base aircraft has at least one radar altimeter directed at the earth's surface, then especially good observation of the earth's surface is possible, even when it is cloudy, thus enabling object identification over the altitude contour thereby detected.

If the base aircraft has at least one telescopic camera pointed down toward the earth's surface and preferably also has a target illumination device assigned to the camera, thus permitting observation of the earth's surface during both day and night.

The method according to the invention for airborne inspection and/or engagement of objects on land or at sea, in particular by means of an air-to-surface surveillance and/or weapons system comprises the following steps:

Detecting objects by means of an observation device provided on board a base aircraft;
Observing the detected object in the spectrum of visible light or in the infrared spectrum using a telescope provided on board the base aircraft, and/or also using a radar observation system;
Releasing a slave aircraft from the base aircraft and controlling the slave aircraft in the vicinity of the object;
Executing an inspection or engagement mission against the object by means of observation means or weaponry provided on board the slave aircraft;
Returning the slave aircraft to the base aircraft, and
Docking the slave aircraft on the base aircraft.

This method according to the invention makes it possible to continuously observe an area on the earth's surface, for example, a part of an overland or maritime route using a base aircraft flying at a great elevation and its on-board observation system, and to monitor the traffic along this route. The observation system may alternatively or cumulatively comprise imaging systems, radar equipment, laser optical observation equipment or other suitable sensors.

For example, such sensors may belong to an automatic ship's identification system (AIS), with which it is possible to identify ships on the basis of a transponder code. The base aircraft becomes an AIS base station in this way. Therefore, the international AIS system, which is already in use near the coast, can also be expanded to the high seas. It is thus possible to request the data of ships detected by this base station on the maritime shipping route being monitored, and to do so from an AIS base station on board the base aircraft and to send this data to a central AIS data system as well as to the control station for comparison and to thereby identify the ships detected. Therefore, large-scale tracking files for ships, even outside of coastal waters, can be created.

With respect to deployment over maritime shipping routes, using the system and the method according to this invention creates a possibility of detecting all moving high-seas-worthy marine craft by day and at night, even in bad weather, over a large area of a monitored sea region using Doppler radar, for example, regardless of their direction of travel, and track them over their course for a long time. The ship's position thereby detected can be compared and verified with the AIS position data transmitted.

If ships that do not enable AIS identification or for which there is doubt as to the identity of the AIS identification received are detected by an on-board radar system on the base aircraft, then the base aircraft can fly over the target ship directly at high altitude and can measure a specific height signature using an imaging precision radar altimeter. This height signature can then be compared with reference signatures stored in a database by means of automatic image recognition methods to identify the ship in that way.

If a ship still cannot be identified even with such a radar device, then the drone can fly toward the target ship at a high altitude (for example, up to max. 40 km distance) and record a specific multispectral image signature of the target ship using a high-resolution imaging multispectral telescopic camera that operates in the near infrared range (NIR) and is provided on board the base aircraft. This multispectral image signature can then be compared with data on reference signatures kept in a database using an automatic image recognition method, which thus allows identification in this way.

Ships whose activities give rise for concern due to a lack of clarity in the identification or due to their behavior can also be surveilled continuously at short distances by day and night using high-resolution optical sensors provided on board the base aircraft, so that their intentions can be assessed more reliably. In a step which goes farther than that, ships that have not been identified as harmless and are entering a defined protection area of the maritime region being monitored can be identified by means of a slave aircraft that detaches itself from the base aircraft and goes into low-altitude flight to inspect the ship in question or to make acoustic contact with the ship's crew. The slave aircraft is preferably capable of hovering and can therefore assume a quasi-stationary position above the ship to be inspected. For example, if it is recognized that there is a hazardous situation for other ships on the maritime shipping route because the ship inspected has been identified as a pirate ship, then the slave aircraft can attack this pirate ship with its on-board weaponry. After deployment, the slave aircraft can return to the base aircraft and reconnect to it and can also be refueled again as needed from the base aircraft.

By means of the slave aircraft, which can be uncoupled from the base aircraft and then coupled back onto it again, it is also possible to provide an armed escort for ships that are at particular risk on the maritime shipping route in order to ward off any pirates from attacks for a short period of time.

The positioning of the base aircraft above the maritime shipping route to be monitored and the relatively short distances of the slave aircraft from the base aircraft down to the maritime shipping route (or the overland route being surveilled) make it possible to promptly detect a surprise attack by means of the sensor system of the base aircraft, in particular at night or under poor visibility conditions, and to combat the attacking pirates (or terrorists) through the slave aircraft, which can be brought quickly to the site of deployment. To do so, non-lethal weapons, for example, sound guns, are used first against the attackers, and if these are not sufficient, the fire power of automatic weapons on board the slave aircraft may be used against the attackers to stop them and to defend against the attack before the pirates are able to board a ship that is being protected and take its crew hostage.

Multiple deployment groups, each consisting of a base aircraft and a slave aircraft that can be coupled to it, may be advantageously used to secure overland routes and/or maritime routes. The individual deployment groups are connected to one another by their own data link system and are connected to the manned control station, which may be on the ground, for example. The individual base aircraft and slave aircraft may be remote-controlled from the control station, and the data acquired by the on-board sensors on the aircraft is transmitted to the control station over the data link system for further analysis.

One or more control stations may be provided and may be equipped with flight guidance personnel, remote-control pilots and other sensor operating personnel and weapons operating personnel in addition to personnel for evaluating the data transmitted, some of which is also done automatically.

Large-area surveillance of the observation region to be surveilled (over land or at sea) is conducted, for example, by a group of specialized base aircraft, each of which has a pulsed Doppler radar system on board, and they cooperate mutually, for example. This system of cooperating pulse Doppler radar equipment, in particular for maritime use, ensures surveillance of a large area by day or night and even under bad weather and poor visibility conditions.

When visibility is poor due to cloud cover, the pulse Doppler radar equipment is supported by additional base aircraft equipped with precision radar altimeters with monopulse antenna groups. With this equipment it is possible to measure a specific height signature above the surface, e.g., the surface of the ocean, and to measure the relative horizontal arrangement of the height elements or ships in relation to one another, these elements being directly beneath the respective base aircraft flying at an altitude of 15 km, for example. Automatic image recognition software can compare this detected height signature with reference height signatures stored in a database and to identify the ships thereby detected in a method that is counterfeit-proof, even when there is no ground visibility. In addition, a suspect ship can be monitored with this precision radar altimeter even under bad weather conditions without ground visibility, and it is possible to ascertain if ship's dinghies that may be used for pirate attacks are being used, for example. In this way, it is possible to reliably trigger an alarm even when visibility is poor.

If there is adequate ground visibility, a large-area continuous imaging visual observation may be conducted by means of optical surveillance equipment, permitting an additional independent counterfeit-proof identification of all ships detected by the radar in both day and night. To this end, a number of base aircraft are equipped with near infrared multispectral telescopic cameras that are supported for operation at night and under poor visibility conditions caused by haze, dust or light rain by an artificial remote illumination device on board the respective base aircraft. This group of base aircraft equipped with the NIR multispectral telescopic cameras forms a large-area multispectral sensor arrangement. Identification of ships by automatic image recognition software through visual observation even under suboptimal visibility conditions can be based on their multispectral signature and by using reference images stored in a database.

The slave aircraft are equipped with all-round 360° pivotable multispectral cameras with search lenses and their own lighting unit for all-weather operation as well as with a coaxial laser range finder. Directional loudspeakers and directional microphones enable acoustic communication with ship's crews being inspected in conducting near inspections of moving ships. Furthermore, the slave aircraft are equipped with a sound gun for warning off attackers and a multi-shot rocket launcher capable of precision aiming of the fuel-air compression wave grenades by means of a remote-controlled fire control system with an accuracy of more than 1 kilometer. These non-lethal weapons serve to ward off potential attackers and divert them from their goal. In the event these non-lethal weapons are not sufficient, the slave aircraft are also equipped with suitable weapons that can be used for a targeted attack against a ship or against persons.

The aircraft of the system according to the invention may be embodied by this solar power drive having an almost unlimited useful lifetime for surveillance, inspection and protection tasks over land and at sea. One or preferably more deployment groups, each consisting of a base aircraft and a slave aircraft, i.e., remote-controlled and unmanned aircraft cooperating with one another, are provided, each being equipped with special sensors and weapons systems and being interconnected via their own data link system and connected to a manned control unit on the ground. The aircraft are controlled and remote controlled from this ground control unit. The ground control unit consists of one or more command stations, control stations and ground stations, in which flight guidance personnel, remote-control pilots and sensor and weapons operating personnel are provided to control the individual aircraft of the system and to operate their equipment. In addition, the ground stations have analysis systems on which corresponding computer programs are run, analyzing the data received from the aircraft via the data links and picked up by their sensors.

In such a deployment group, the base aircraft may each carry an AIS base station of an automatic ship identification system AIS (automatic identification system), which thereby become flying AIS base stations. In this way, the automatic ship identification system previously provided with AIS base stations on land can be expanded from coastal waters to the high seas. Thus, in the future, all ships that carry their own AIS transponder can be queried for their ship passage data by means of the flying AIS base stations, which can cover a large area (distances up to 500 km) in the surveilled area. This data may be sent from the base aircraft to the ground control station for comparison with the data link, embodied as a broadband data link, and the control station then relays this data further to central AIS office. Movement profiles (tracking files) can also be created for ships at sea in this way, so it is possible to ascertain whether a ship has departed from its planned route, which might infer a hijacking by pirates.

The special sensor equipment for large-area all-weather active surveillance of the outer maritime protection area is carried by base aircraft specially equipped for this purpose and comprises a system of cooperating pulse Doppler radar units (PD radar) for maritime use for large-scale surveillance at night and under bad weather and poor visibility conditions, such that this system can determine the position data and the course of all ships and can compare and verify their position with the AIS position data transmitted.

In poor visibility due to clouds, the PD radar units are supported by additional base aircraft, which are equipped with precision radar altimeters having monopulse antenna groups. These altimeters make it possible to measure a height signature above the surface of the ocean and to measure the arrangement of altitude elements of ships in relation to one another when the ships pass directly beneath the base aircraft flying at an altitude of 15 km, for example.

In the case of ships equipped only with radar and without AIS identification and ships for which there is still doubt as to their identity, the specific height signature of the ship can be measured using such imaging precision radar altimeters. This height signature can be compared with reference signatures stored in a database by means of an automatic image recognition process. If the data of the respective ship is stored in the database, unique and secure automatic ship identification can be made in this way. The reference database contains a radar altimeter signature for each ship with an AIS transponder and AIS identifying code traveling in the maritime region being monitored. This radar altimeter signature is recorded and saved by each ship entering the surveillance region for the first time. Ships without an AIS identifying code are scanned and processed in a separate reference data file. Among other things, the freeboard level of the target ship can be measured by the radar altimeter and the result compared with the data obtained by AIS regarding the draft of the ship. This also makes it possible to measure the ship's cargo status directly and without classification.

Furthermore, suspect ships can also be observed by means of the precision altimeter even in bad weather and with poor ground visibility, and in particular it is possible to ascertain when dinghies that could be used for pirate attacks are launched from these ships. Then a pirate attack alarm could be triggered reliably even in bad weather or when there is little or no ground visibility.

In addition, some of the base aircraft of the system according to the invention, which travel over an area to be monitored, are equipped with near-infrared multispectral electron multiplied CCD telescopic cameras, which are additionally furnished with an artificial remote illumination device for operation at night and in bad weather. This permits continuous and large-area imaging optical observation and identification of all ships detected by the radar by day and at night, even under poor visibility conditions caused by haze, dust or light rain in the area being monitored. High-resolution multispectral images of the target ship suitable for automatic analysis can be recorded directly over the target ship from an altitude of 20 km in a special operating mode of the EMCCD camera with a high light amplification (300 to 1000) and especially strong illumination (up to 5 kW light current). These images can be recorded even if a dense cloud cover, e.g., of cumulus clouds up to 5 km thick normally obstructs ground visibility. In this operating mode, the EMCCD camera can replace the precision altimeter in target signature measurement in 95% of all weather conditions.

If this ground visibility is adequate, this special optical sensor equipment may be performed for continuous and large-area imaging optical observation for additional independent and counterfeit-proof identification of all ships covered by the radar by day and at night by comparing the target images with reference images saved in another database, such that the comparison of the images recorded with the reference images is made by using an automatic multispectral image recognition system. This reference image database contains a multispectral image signature for each ship with an AIS transponder and AIS identifying code traveling in the monitored marine region. This multispectral image signature is recorded and saved for each ship entering the surveillance area for the first time. Ships without an AIS identifying code are scanned and processed in a separate reference image data file.

In addition, the base aircraft are equipped with a transceiver equipment for a large-area broadband data link among the aircraft and with the control station on the ground. This transceiver equipment is preferably provided in each base aircraft, which is equipped as an AIS base station with corresponding electronic transceiver equipment and is flying at high altitude (15 km to 20 km). These special base aircraft thus form relay stations for the data link traffic.

The slave aircraft perform the inspection and protection jobs at a low flying altitude and in the vicinity of the ships to be protected. These small maneuverable slave aircraft that are also capable of hovering can dock on a docking device provided on the respective base aircraft by using coupling means and can also be launched from there.

The equipment on the slave aircraft includes 360° pivotable multispectral cameras with zoom lenses and their own lighting unit for all-weather operation as well as a coaxial laser range finder, directional loud speaker and directional microphone for performing near inspections and for acoustic communication with crews of ships to be inspected. The equipment for performing the protective jobs and/or for defending against pirate attacks includes a sound gun for warning attackers and a multi-shot rocket launcher which can shoot, for example, fuel-air compression wave grenades by means of a remote-controlled fire control system to distances of more than a kilometer with precision.

The system according to the invention comprises one or more deployment groups, which consist preferably of multiple base aircraft that work together with one another and are specialized for certain tasks, combining in one group all the capabilities needed for the deployment task. For monitoring large marine regions, the equipment may be expanded to multiple cooperating deployment groups and ground control units.

Preferred exemplary embodiments of the present invention with additional embodiment details and additional advantages are described and explained in greater detail below with reference to the accompanying drawings.

BRIEF DESCRIPTION OF THE DRAWINGS

FIG. 1 shows a rear view of a base aircraft according to the invention embodied as a high-altitude aircraft, shown in the direction of flight;

FIG. 2 shows a perspective view of the base aircraft according to the invention according to FIG. 1;

FIG. 3 shows a cross section through a wing along line III-III in FIG. 1;

DESCRIPTION OF PREFERRED EXEMPLARY EMBODIMENTS

Figure 4:
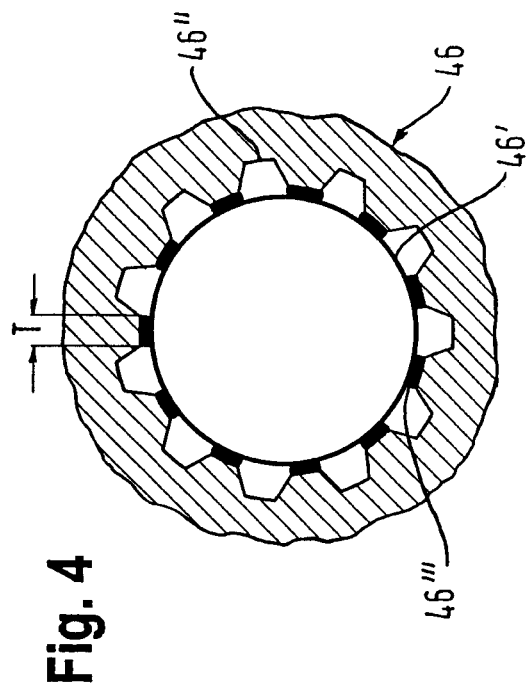
FIG. 4 shows a cross section through a reinforced tubular spar.

FIG. 1 shows a base aircraft 1 according to the invention, embodied as a high-altitude plane, shown in a rear view in the direction of flight. Such a high-altitude plane is described in German Patent document DE 10 2011 116 841 (U.S. application Ser. No. 14/354,030), the disclosure content of which is included in the disclosure content of the present patent application to the full extent.

Two wings 13, 14 are mounted laterally on a tubular fuselage 10 (FIG. 2), which is provided with a balloon-type tip 12 on the nose of the fuselage. A winglet 13', 14' extending essentially vertically is provided on the free ends of each wing 13, 14. An engine pod 15, 16 is mounted on each wing 13, 14 at a distance of approx. ⅔ of its length from the fuselage, the engine pod containing a drive motor 15", 16", each driving a respective propeller 15', 16'. A radar unit and/or other sensor systems for ground observation may be provided in the balloon-shaped nose 12 of the fuselage, which is embodied as a radome.

A third engine pod 17 is mounted on the tip of a tension tower 11, which protrudes upward from the wing. The third engine pod 17 also has a drive motor 17" that drives its own propeller 17'. Although the propellers 15', 16', 17' shown in FIGS. 1 and 2 are embodied as pusher propellers, the driver units may of course also be equipped with tractor propellers.

The tension tower 11 extends not only upward from the fuselage 10 but also downward beyond the fuselage. A left upper guy wire 18 extends from the upper tip of the tension tower 11 to each area of the left wing 13 to which the engine pod 15 is attached. A right upper guy wire 18' extends from the upper tip of the tension tower 11 to the area of the right wing 14, where the right engine pod 16 is mounted in the same way. A left lower guy wire 19 extends from the lower end of the tension tower 11 to the area of the left wing 13, where the left engine pod 15 is mounted, and the right lower guy wire 19' extends from the lower tip of the tension tower 11 to the area of the right wing 14 where the right engine pod 16 is mounted.

The bracing of the free ends of the wing against the fuselage and/or against the tension tower ensures that the wing will not fold upward under the load of the buoyancy forces acting on it. In addition to the free ends of the wing and the guy wires provided on the engine pods, additional guy wires may be mounted on the wing between the wing and the tension tower.

A vertical stabilizer 20 that extends vertically and a horizontal stabilizer 21 that extends horizontally are provided one after the other on the tail end of the tubular fuselage 10. The vertical stabilizer 20 consists of a vertical stabilizer section 20' provided above the fuselage and a lower vertical stabilizer section 20" provided beneath the fuselage 10. Both the upper vertical stabilizer section 20" and the lower vertical stabilizer section 20" are mounted on the fuselage 10, so they can pivot in synchronization about a shared vertical stabilizer pivot axis X running vertically in the horizontal flight and at a right angle to the fuselage axis Z, thereby forming rudders.

The horizontal stabilizer 21 is also divided into two parts and consists of a left horizontal stabilizer section 21' situated at the left of the fuselage 10 and a right horizontal stabilizer section 21" situated at the right of the fuselage. Both of the horizontal stabilizer sections 21', 21" are mounted on the fuselage 10 so they can be pivoted jointly in synchronization about a pivot axis Y running horizontally in horizontal flight and at a right angle to the longitudinal axis Z of the fuselage and thus form pitch elevators.

A landing gear 30, 32, shown symbolically in FIGS. 1 and 2, is provided at the lower end of the tension tower 11 and also at the lower end of the vertical stabilizer 20. The landing gear 30, 32 is installed in the lower part of the tension tower 11 and in the lower rudder 20", so that it can be extracted with little resistance. Payload pads (not shown) may also be provided beneath the fuselage or beneath the wings.

FIG. 2 also shows that the wings 13, 14 have solar cells panels 34, 35, 36, 37 which are subdivided into small areas on their top side beneath their transparent membrane 45 formed in the upper area of the wing. The horizontal stabilizer 21 may also be provided with solar cells in the same way. The solar cell panels are bonded elastically to the outer skin using an adhesive having good thermal conductivity, so that no loads can be transferred to the solar cells.

The wing cross section shown in FIG. 3 reveals that tubes 40, 41, 42, 43 and 44 are provided in the interior of the respective wing 13, 14, these tubes running in the longitudinal direction of the respective wing 13, 14, i.e., at a right angle to the longitudinal axis Z of the fuselage and are arranged side by side in such a way that they support a shell 45 forming the wing skin. The interspaces 48 between the tubes 40, 41, 42, 43 and 44 and of the shell 45 are cooled with ambient air using a fan (not shown), so that any heat generated in the tubes 40, 41, 42, 43, 44, which are embodied as tanks is dissipated to the environment.

In addition, FIG. 3 shows that two of the tubes 41, 42 are embodied as airtight tubular wing spars 46 and 47 that have been reinforced to prevent bending and bulging. The profiles formed from the two wing spars for reinforcing the respective wing are connected to one another and to the fuselage 10 and support the tension tower 11.

FIG. 4 shows a cross section through a reinforced tubular wing spar 46, which—like the wing spar 47—consists of an inner tube 46' and an outer tube 46" that is corrugated in the longitudinal direction. The inner tube 46' and the longitudinally corrugated outer tube 46" are bonded to one another continuously along their contact faces, which form adhesive sites 46"', so that a uniform supporting element is formed. The airtight inner tube 46' assumes the function of the tube 41 and thus serves as a receiving space for hydrogen gas or oxygen gas.

The inner tube 46' is formed, for example, as a tube made of Kevlar® film or a fabric of carbon fiber reinforced plastic and has, for example, a diameter of 0.9 m at a span of the aircraft of 50 m. The wall thickness of the inner tube and of the outer tube is 0.1 mm, for example. The pitch T of the outer tube 46" is 5 mm, as measured in the circumferential direction, for example.

Due to the closed profile formed from the outer tube and the inner tube, the tubular spar thereby formed is reinforced against bulging, so that it can utilize the full calculated bending moment strength and bending resistance of the profile as a whole. In addition, the tubular spar is reinforced at regular intervals by rings with a closed profile on the inside, these rings maintaining the cross section of the spar up to full bending strength and kink strength.

The tubular wing spar assumes two functions here, namely first that of a load-bearing element and secondly that of a pressurized storage for hydrogen gas or oxygen gas. It is especially advantageous that the material thicknesses for the pressurized tank are approximately the same as those for the load-bearing spar at the selected loads and operating pressures, but the loads act in different directions, so that this practically eliminates the weight of an additional component to be provided.

The individual tubes 40, 41, 42, 43 and 44 and the tubular wing spars 46 and 47 form chambers for storing hydrogen gas and/or oxygen gas. At least one of the tubes may also have a chamber for storing water formed in a fuel cell in generating power. With the high-altitude aircraft according to the invention, which has a very large wing and can reach high speeds, the hydrogen gas and the oxygen gas are thus accommodated in the wings with a thick profile in pressure-resistant tubes in a space-saving manner, so that there is no additional resistance.

The wing assembly consisting of the two wings 13, 14 is provided with winglets 13', 14' on the two ends, these winglets being of such dimensions that they increase the effective wing span by 60% from 10 to 16 meters without any significant increase in flying weight. The winglets 13', 14' are preferably equipped with rudders 13", 14", so that the high-altitude aircraft can generate a direct lateral force with appropriate rudder control, allowing a shift-free inclined flight with a low resistance with an inclined position of 40°, for example. If the direction of flight is selected to be across the incidence sunlight, the angle of impact of the rays of the sun on the solar cells 34, 35, 36, 37 may be made steeper by 40°. When the position of the sun is 15° above the horizon, the angle of incidence may thus be increased to 55°. This means that the solar cells can utilize 80% of the solar energy with this maneuver instead of 25% of the incident solar energy, i.e., 3.2 times greater. Thus, for example, the energy output during the day can be almost doubled for 6 hours in the morning and evening in the tropics and for the entire day in the central latitudes, and the daily average can be increased to more than 85% of the maximum possible value.

Figure 5:
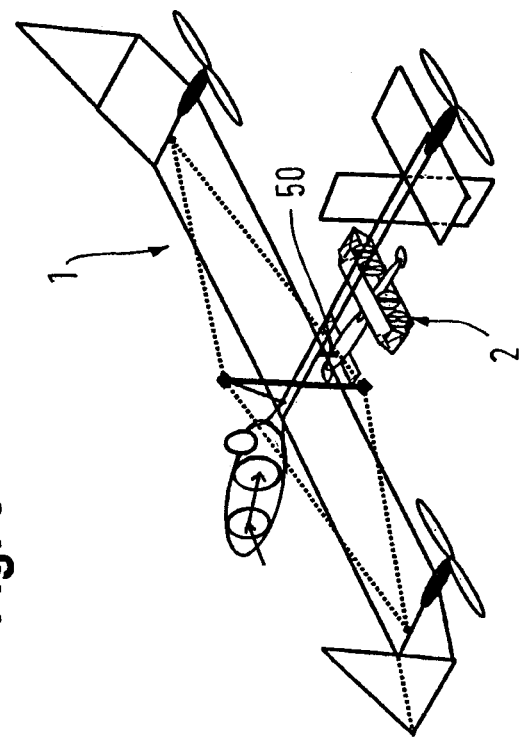
FIG. 5 shows a link-up of a base aircraft and a slave aircraft, which is coupled to the former.

FIG. 5 shows the base aircraft 1 with a slave aircraft 2 coupled to it and is described in greater detail below. With the help of the coupling devices 52, which are shown only schematically (FIG. 2), the slave aircraft 2 can be uncoupled from the base aircraft 1 during flight and then coupled back to it also while in flight. Furthermore, the slave aircraft 2 can be refueled from the base aircraft 1 via the coupling equipment. The base aircraft 1 is therefore provided with a coupling device 50 on its lower side, preferably on the lower side of the fuselage 10, where the coupling devices 52 are arranged. The coupling device 50 for the slave aircraft 2 can be pivoted away and downward from the fuselage to launch the slave aircraft 2. When the slave aircraft 2 lands on the base aircraft 1, the coupling device 50 as also in the downward pivoted position. The slave aircraft 2 can intervene then and can be latched onto the coupling devices 52, so that the refueling connection between the base aircraft 1 and the slave aircraft 2 is established at the same time. For flight, the slave aircraft 2 can be raised upward to the underside of the fuselage 10 for pivoting the coupling device 50 upward on the lower side of the fuselage.

This pairing of the base aircraft 1 and the slave aircraft 2 is the smallest unit in the air-to-surface surveillance and/or weapons system according to the invention.

Figure 6:
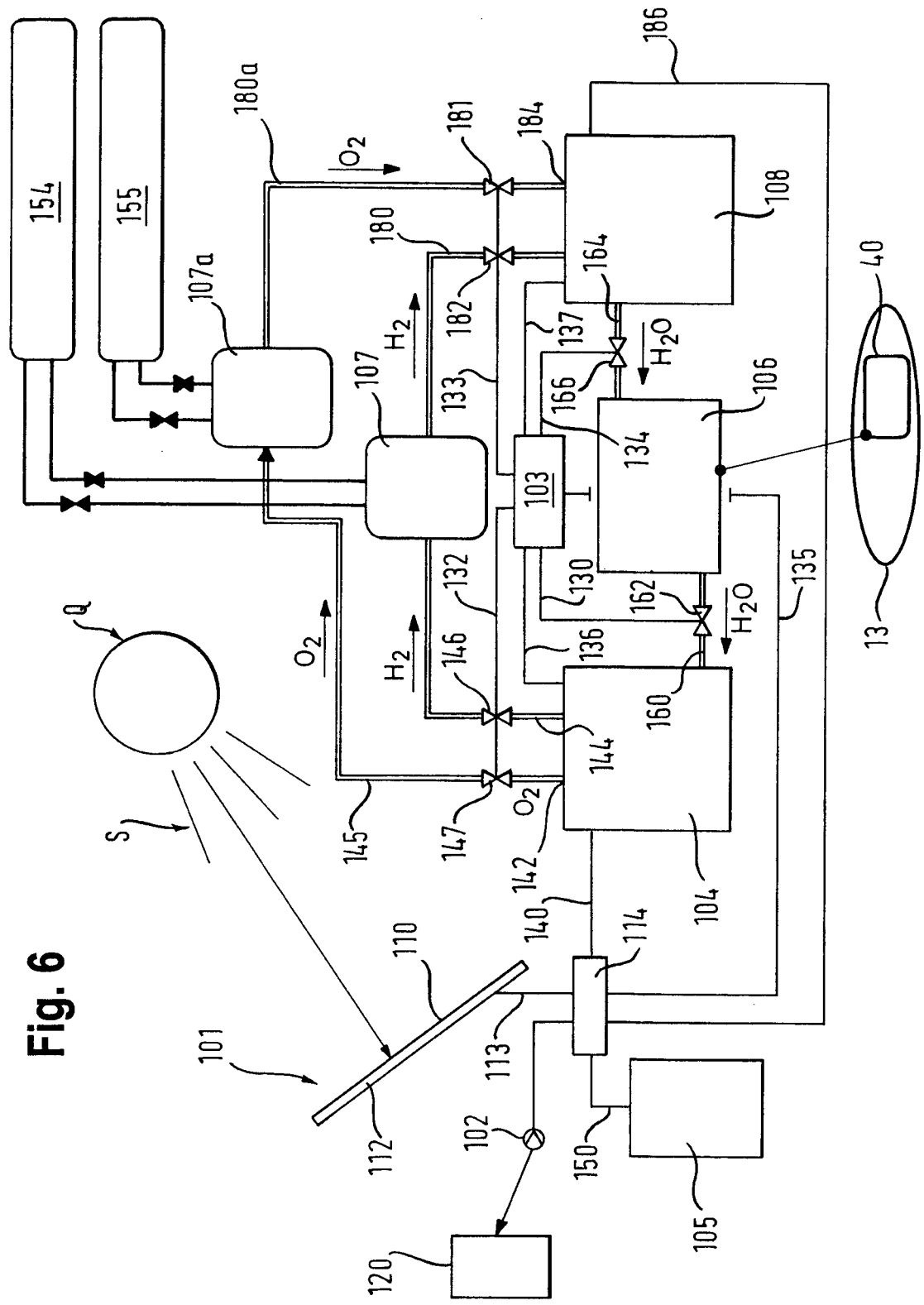
FIG. 6 a schematic diagram of the power supply system of the high-altitude aircraft according to the invention.

An electric drive motor has proven to be especially suitable for the respective propeller drive of the base aircraft 1 and also of the slave aircraft 2. The drive energy for the electric drive motor and also for other electric consumers of the respective aircraft and is payload is preferably generated by a photovoltaic power supply system, as shown in FIG. 6, which is provided with at least one photovoltaic solar generator 101 that converts the incident radiant solar energy S into electric energy, a control unit for the solar generator 101 and at least one water electrolysis unit (only in the base aircraft) for generating hydrogen and oxygen from water.

The power supply system additionally comprises at least one water storage tank 106 connected via a first water line to the water electrolysis unit (hydrogen generator 104) which operates at a constant ground pressure. The gases generated in the base aircraft are compressed from ground pressure to the storage pressure of the wing tanks by pumping from 1.2 bar to 2.2 bar. The wing tanks comprise at least one hydrogen storage tank 107, which is preferably formed by the first chamber, and one oxygen storage tank 107a, which is formed by the second chamber. The hydrogen storage tank 107 and oxygen storage tank 107a are respectively connected to the water electrolysis unit via a first hydrogen line 144 and a first oxygen line 142.

The power supply system additionally comprises at least one hydrogen storage tank and one oxygen storage tank, each being supplied from the wing tanks and kept at a constant ground pressure, and having at least one fuel cell, which is connected via a second hydrogen line to the hydrogen storage tank and a second oxygen line to the oxygen storage tank.

The fuel cell generates water and electric energy from the two gases hydrogen and oxygen stored in the respective tanks of the base aircraft and/or of the slave aircraft, and it is connected via a second water line to the water storage tank, which also operates at ground pressure. The power supply system has a control unit 103, which is electrically connected to the solar generator, the water electrolysis unit and the fuel cell and controls the power supply system, so that the payload, the electrolysis unit, the motors and the device control are supplied with enough power.

FIG. 6 shows the entire solar drive with the energy storage in the form of hydrogen gas and the closed water, hydrogen gas and oxygen gas circuits. All the devices and motors operate at a constant pressure of 1.2 bar in a hydrogen atmosphere. This pressure level is often maintained in the hydrogen and oxygen storage tanks.

FIG. 6 shows an electric generator that forms the solar generator 101, which receives radiant solar energy S. The solar generator 101 is provided with solar cells on its surface facing the sun Q, these solar cells being mounted on a carrier element 112. Although only one carrier element 112 provided with solar cells 110 is shown in the figure as an example, the solar generator 101 may of course also have a plurality of large-area carrier elements 112 provided with solar cells 101. The solar generator may also utilize technologies other than solar cells that make it possible to generate electric energy from radiant solar energy.

The electric energy generated in the solar generator 101 is sent through a first power line 113 of a power distribution system 114. The power distribution system 114 is controlled by a central control unit 103, such that a portion of the electric energy supplied over the first power line 113 is relayed to the hydrogen generator 104, which is embodied as a hydrogen electrolysis unit.

Another portion of the electric energy introduced into the power distribution system 114 is sent to an energy storage mechanism 105, for example, a battery to charge the latter if the electric energy storage mechanism 105 is not adequately charged. The remainder of the electric energy supplied to the power distribution system 114 is sent via line 150 to a consumer connection 102, from whence the useful electric energy supplied by the photovoltaic power supply system can be distributed to electric consumers 120.

The electric energy storage mechanism forms a buffer storage, which can distribute electric energy briefly whenever the solar generator is not receiving enough radiant solar energy for a short period of time. This electric energy storage therefore serves to bridge the time required to activate the fuel cell, or if the fuel cell is not activated, to bridge the time that occurs, for example, in brief shading of sunlight such as that which can occur in flight maneuvers, until sunlight is striking the solar generator again fully.

The hydrogen generator 104, which is embodied as a hydrogen electrolysis unit, is supplied with water through a first water line 160 from a water storage tank 106 formed by a first chamber of the high-altitude aircraft (e.g., the tube 40 in the wing 13). An electrically operable valve 162 which can be controlled by the control unit 103 via a first control line 130 to control the flow of water from the water storage tank 106 to the water electrolysis unit 104 is provided in the first water line 160.

The water introduced into the water electrolysis unit 104 is split into oxygen and hydrogen by means of the electric energy supplied by the power distribution system 114 over a second electric line 140. The hydrogen is introduced through a first hydrogen line 144 into a hydrogen storage tank 107, which is kept at a constant pressure of 1.2 bar by bleeding off hydrogen into the hydrogen wing tanks 154 formed by a first part of the remaining tubes 41, 42, 43, 44. The oxygen is sent through a first oxygen line 145 into an oxygen storage tank 107a, which is kept at a constant pressure of 1.2 bar by bleeding off oxygen into the oxygen wing tanks 155 formed by a second portion of the remaining tubes 41, 42, 43, 44. If the pressure in the storage tank drops below 1.2 bar, the pressure is maintained by secondary pumping of gas out of the wing tanks using a gas pump.

An electrically operable valve 146, which can be controlled by the control unit 103 over a second control line 132, is provided in the first hydrogen line 144 to regulate the volume flow of the hydrogen conveyed through the first hydrogen line 144 and to suppress backflow of hydrogen from the hydrogen storage tank 107 into the hydrogen generator 104.

A similar procedure is followed with the oxygen line 145, which therefore has an electrically operable valve 147 that is also controlled by the control unit 103.

In addition, FIG. 6 shows schematically a fuel cell 108 that receives hydrogen from the hydrogen storage tank 107 through a second hydrogen line 180 and which receives oxygen from the oxygen storage tank 107a through a second oxygen line 180a.

When a high power/weight ratio is required, a hydrogen-oxygen combustion engine with a second power generator downstream, preferably equipped with an exhaust gas turbocharger and a high-pressure hydrogen gas injection may be provided instead of a fuel cell.

An electrically operable valve 182, which is controlled by the control unit 103 via a third control line 133 to control the volume flow of hydrogen through the second hydrogen line 180, is also provided in the second hydrogen line 180. A similar procedure is followed with the second oxygen line 180a, which therefore has an electrically operable valve 181 which is also controlled by the control unit 103.

The fuel cell 108 (and/or the hydrogen-oxygen combustion engine) has an intake port 184 through which oxygen can enter from the oxygen storage tank 107a. Electric energy is generated by a known method from the hydrogen and oxygen supplied in the hydrogen-oxygen fuel cell 108 (and/or the hydrogen-oxygen combustion engine with a power generator) and this electric energy is sent to the power distribution system 114 via a fourth power line 186.

Water formed in the fuel cell 108 (and/or the hydrogen-oxygen combustion engine) in recombination of hydrogen and oxygen is introduced through a second water line 164 into the water storage tank 106. An electrically operable valve 166 that can be controlled by the control unit 103 via a fourth control line 134 is also provided in the second water line 164.

The control unit 103 is connected to the power distribution system 114 via a fifth control line 135 (shown with a broken line in FIG. 6) to control the power distribution system 114 and therefore the distribution of the electric energy introduced into the power distribution system 114 via the first power line 113 and the fourth power line 186.

In addition, the control unit 103 is also connected via a sixth control line 136 to the water electrolysis unit 104 for controlling the latter. A seventh control line 137 connects the control unit 103 to the fuel cell 108 (and/or the hydrogen-oxygen combustion engine with generator) to control it/them.

As shown in FIG. 6, a closed circuit of hydrogen gas ($H_2$), oxygen gas ($O_2$) and water ($H_2O$), represented by the arrows, is formed between the water electrolysis unit 104 and the fuel cell 108 (and/or the hydrogen-oxygen combustion engine), the closed circuit including the water storage tank 106 and the hydrogen storage tank 107, and the oxygen storage tank 107a. Due to the closed circuit, no contaminants can enter the system and the working pressure of the system can be kept constant at a favorable level regardless of the flying altitude.

This photovoltaic power supply system which is provided in the base aircraft shown here—and also in the slave aircraft but without the hydrogen generator thus receives power from the outside only through the radiant solar energy S, wherein some of the electric energy generated is used to fill the buffer storage (battery energy storage mechanism 105 and hydrogen storage tank 107), from which stored energy can then be retrieved and distributed as electric energy to the consumers when required by peak loads or when little or no radiant solar energy S is available.

The generated electric energy also drives the steering engines, which in the form described here activate the ailerons 13", 14" for the roll control, the rudder 20 for the yaw control and the elevator 21 for the pitch control.

The hydrogen stored in the wing tanks fulfills the task of a buoyant gas and also that of a fuel for the fuel cell at the same time. Alternatively, the drone (either the base aircraft or the slave aircraft) can be operated by a hydrogen-oxygen combustion engine according to the diesel principle with a downstream exhaust gas turbocharger and high-pressure hydrogen injection, which achieves approximately the same efficiency as the electric motor with the fuel cell but has a lighter design. On the other hand, the internal combustion engine generates more vibrations than the electric motor, is louder and consumes more energy for cooling.

Providing a photovoltaic solar generator, a hydrogen electrolysis and a fuel cell in parallel in this power supply system makes it possible to use some of the electric energy generated by the solar generator to generate hydrogen and oxygen from water when sufficient radiant solar energy is available, this hydrogen then being available at night when radiant solar energy is no longer available or when the radiant solar energy is inadequate and being recombined with oxygen to form water in the fuel cell for generating electric energy by means of the fuel cell at night when radiant solar energy is no longer available.

The photovoltaic power supply system is therefore provided with control unit 103 designed so that when radiant solar energy is available the electric energy generated by the solar generator is supplied to an electric consumer connection of the power supply system and when radiant solar energy is not available or when the electric energy generated by the solar generator is not sufficient for a given energy demand, it activates the fuel cell to supply electric energy to the consumer connection. This control unit thus ensures that the fuel cell is automatically activated when little or no radiant solar energy is available.

When there is radiant solar energy the control unit 103 supplies a portion of the electric energy generated by the solar generator to the water electrolysis unit and supplies water from the water storage tank to the water electrolysis unit, so that the water electrolysis unit is activated to generate hydrogen and oxygen from the water supply to it, this being stored in the hydrogen storage tank and/or the oxygen storage tank. A portion of the electric energy generated by the solar generator is always used to operate the water electrolysis unit to produce the hydrogen needed by the fuel cell for generating electric energy when the solar generator is not supplying any electric energy or not enough. Then the control unit can control the quantity of electric energy supplied to the water electrolysis unit or the on-times of the water electrolysis unit as a function of the available hydrogen supply.

In this way, electric energy that is either supplied directly by the solar generator or is generated indirectly via the solar cell is always available. The only energy input for this system is radiant solar energy because water, hydrogen and oxygen form a circuit having storage tanks for water, for hydrogen and for oxygen. The closed circuit has the advantage that no impurities can interfere with operation. Furthermore, a constant operating ambient pressure is always maintained regardless of the flying altitude, and no compressor work is required for compressing the fuel gases at high altitudes.

The maneuverability of the base aircraft is further improved if the aircraft is equipped with fully movable elevators 21', 21" and rudders 20', 20", which are preferably mounted on the fuselage 10 with a long tail unit lever arm. These elevators and rudders may also be constructed in the same way as wings, so that an especially effective maneuverability of the aircraft is achieved with an extremely low weight.

The on-board power supply of the base aircraft described above and the option of refueling the slave aircraft permit especially long deployment times of the system according to the invention.

With the embodiment of the base aircraft according to the invention as described here, which may also be referred to as a parent aircraft, electric energy is generated directly from solar energy with the help of thin-film solar cells covering almost the entire top surface of the aircraft, i.e., the wings, the tail unit and the fuselage, in combination with a favorable alignment of the solar cells in relation to the sun through corresponding flight maneuvers to increase the energy yield. Since enough energy must be collected during the day to supply an adequate amount of storable and retrievable energy in the form of hydrogen gas for flying at night, the solar generator area must be large enough in comparison with the area of the wing. On smaller planes with a wing span of 25 meters, for example, and an area load of more than 4 kg/m$^2$, for example, the solar generator are must be larger than 50% to 70%, for example, than the wing area generating the buoyancy in order to be able to collect enough energy for flying at night.

For other design parameters the required solar generator area can be determined according to the invention by compiling a corresponding energy balance for flying in the day and at night with energy storage and energy recovery. To do so a sufficiently large fuselage is used, having the additional solar generator area on its top side and offering additional room for storage of the hydrogen gas for nighttime operation. To combine optimal storage capacity with minimal air resistance the fuselage is designed with a length-to-diameter ratio of 6 to 8 and with the distance between the leading edge of the wing and the maximum profile thickness being 50% to 60% and it is provided with a very smooth hydrodynamically favorable surface, so that laminar flow is maintained over the fuselage up to the greatest thickness and the fuselage has a very low air resistance. In the area of the greatest thickness, the fuselage surface is additionally equipped with fine longitudinally grooved surfaces so-called riblets that shift the reversal point from laminar flow to turbulent flow further toward the rear and thus further reduce the flow resistance. To minimize the weight of the hydrogen storage, the fuselage according to the invention is designed as a balloon with a thin Kevlar® film, for example, 200 μm thickness with a diameter of 1 m at 10 bar operating pressure and thus can accommodate, for example, approximately 6 kg hydrogen in a pressurized container with a weight of only 8 kg.

The use of solar current to produce storage energy in the form of hydrogen takes place in the water electrolysis unit by means of the electrolysis of water taken from a reserve tank.

In addition, the base aircraft can be refueled with hydrogen gas from a refueler if the demand for power is greater than the on-board solar system can supply. The hydrogen gas is stored in the fuselage of the aircraft, which is therefore equipped with a shell in the manner of a non-rigid airship that holds hydrogen gas. In addition, the hydrogen may also be stored in the excess pressure-resistant tubes of the wing. At least two of these spar tubes of the wing are reinforced in the interior with tubular girders in a lightweight construction of carbon fibers to absorb compressive stresses and are fixedly joined together. The wing is reinforced by guy wires and the vertical compressive load is returned back to the wing spar reinforcement from the base of the guy wires via additional compression bars, as already described above. The wing spar and the compression rods are fixedly connected to the back of the fuselage spar embodied as a tubular girder to form a unit. The wing is covered with Kevlar® film with UV protection. This design permits an extremely lightweight construction of the wing with a high surface quality.

The extremely lightweight hydrogen storage tanks described here serve as buoyancy elements that support a substantial portion of the flying weight near the ground and thus reduce the required drive power.

The fuselage may also be used as a radome and therefore has a large diameter to hold one or more radar units as well as the data link systems. These radar units and data link systems are also operated with solar energy.

Hydrogen combustion engines, which are supplied directly with stored hydrogen as propellant, may be used to drive the aircraft. These hydrogen combustion engines achieve an especially high efficiency with compressor charging and hydrogen injection under a high pressure.

It is also advantageous if a very large collapsible propeller with a flapping hinge on the rotor axis that can be uncoupled from the drive for maneuvers in which the large propeller would be a disadvantage is used. This propeller with a flapping hinge makes it possible for the base aircraft to fly with very little vibration and with a low energy consumption, which permits the use of telescopic cameras having a long focal length on board, also driven by solar power.

If the wing is designed in the manner described here with a high stretch and with a pipe grid spar and pipe grid span as well as with the guy wires described here for relieving the bending stress and covered with Kevlar® with UV protection, which is under a slight internal pressure, the result is a particularly efficient, wrinkle-free and fold-free wing having a very high surface quality which makes it possible to use laminar profiles having a very low air resistance and thus leading to a low energy consumption in flight which can then be covered by solar energy.

In detail, the base aircraft have the following additional advantages:
  the ground and the air space near the ground can be monitored by using solar power with a practically unlimited flight time;
  the solar power-driven high-altitude flight can be maintained day and night in summer and in winter with an almost unlimited life time and with a high payload ratio (e.g., 50%) of the flying weight;

members of a group of base aircraft with a good power supply and low power consumption can refuel members having a high energy demand in air;

all the base aircraft can carry small fast maneuverable slave aircraft having VLTO capabilities and special weapons in a deployment area and have them launch and land in air and refuel in air;

due to their design as a radome for sensors and data link systems, the base aircraft can carry large lightweight antennas, which permit the construction of such systems with a low weight and low power consumption;

the base aircraft can fly with a low power consumption due to the use of a special large propeller, and they can fly with very little vibration at the same time using a flapping hinge on the rotor axis of the propeller, which permits the use of telescopic cameras on board having a long focal distance;

the base aircraft can fly with a very low power consumption for an unlimited length of time using the solar drive due to the use of a laminar wing of the special design described above and due to the use of the static buoyancy of the hydrogen storage tanks.

Figure 7:
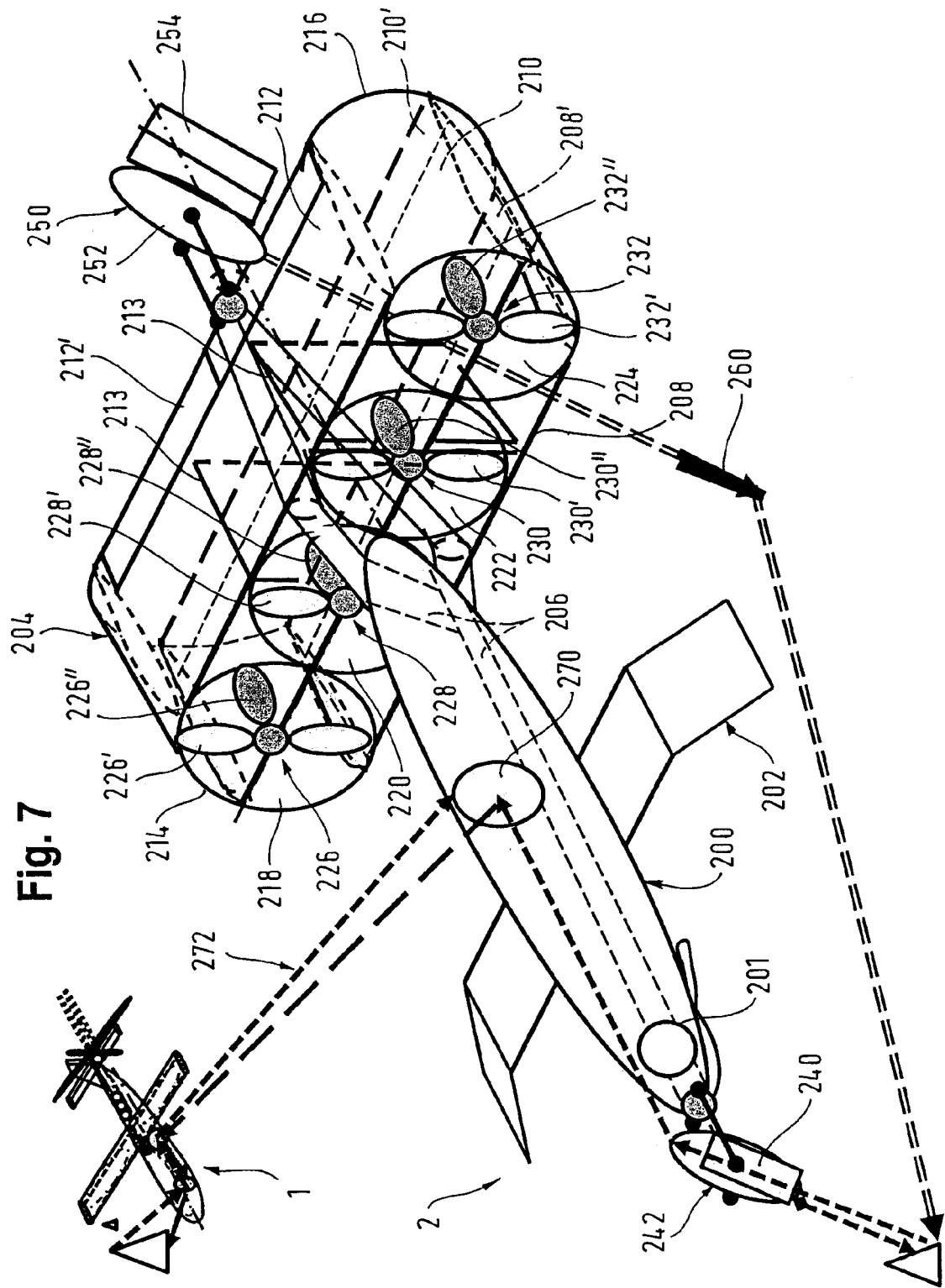
FIG. 7 shows a perspective diagram of a slave aircraft.

The slave aircraft are much smaller and are much faster in their flying performance than the base aircraft they also fly very quietly due to the use of motors with sound absorption and due to the use of shrouded low-load propellers, as illustrated in FIG. 7.

The slave aircraft 2 has a fuselage 200 with a wing 202 mounted on it and an aerodynamically efficient drive unit 204 provided in the tail area. The drive unit 204 is connected to the fuselage by means of a tubular longitudinal spar 206.

The drive unit 204 consists of an aerodynamic structure of three wing assemblies arranged one above the other, a lower wing assembly 208, a middle wing assembly 210 and an upper wing assembly 212. This triple-deck wing arrangement is provided with side walls 214, 216, which connect the wing ends to one another and are curved above a longitudinal axis, forming together with the wings 208, 210, 212 a box-like triple-deck construction that is closed at the sides, so that air can flow through it in the longitudinal direction. This boxy construction is provided with four tubular chambers 218, 220, 222, 224 in the interior running from the front to the rear in a longitudinal direction, each being open on its front side and rear side, so that air can flow from the front to the back through the chambers. A respective drive unit 226, 228, 230, 232 having a propeller 226', 228', 230', 232' and an electric drive unit 226", 228", 230", 232" that drives the respective propeller is provided on the front side of each chamber.

Due to the use of this triple-decker grid wing in the four horizontal chambers, where each chamber is exposed to oncoming flow from a shrouded propeller, the slave aircraft is highly maneuverable. The rear wings 208, 210, 212 are each provided with horizontal rudder flaps (horizontal rudders) 208', 210', 212' on the rear end and with vertical rudders (side rudders) 213 that can be controlled independently of one another. Since these rudders and elevators are exposed to oncoming flow from the air stream from the propellers, a very efficient thrust vector control of the slave aircraft about the vertical axis and about the pitch axis can be implemented. With suitable control by a flight control unit 201, the slave aircraft can thus also be balanced perpendicularly on the propeller stream and thus execute a hovering flight or a vertical takeoff or a vertical landing.

This slave aircraft according to the invention also has VTOL capabilities even with substantial side winds and can also take off vertically, even on ships that have not been prepared for an aircraft landing, and can be anchored there. These properties make it possible for the slave aircraft to land as needed on a location on board a ship and to remain anchored there for a lengthy stay at a location that offers a good field of vision of the ship's environment and allows the takeoff and landing maneuver on the ship to be protected.

The slave aircraft according to the invention is also equipped with 360° pivotable imaging day and night sensors in the form of a near infrared zoom video camera 240 that is accommodated in a housing 242 which is arranged on the nose of the fuselage 200 and can be pivoted in all directions. The camera 240 is line-of-sight stabilized by means of a GPS INS device as an inertial reference. Furthermore, a tele-floodlight adapted to the field of view of the camera is also provided. Directional microphones and loudspeakers can also be provided in the housing 242 for communication with ship's crews on moving ships, thus making it possible to communicate over distances of up to 50 m in slow flight or hovering flight in the vicinity of the ship's bridge.

In addition, the slave aircraft is provided on its tail with a device bracket 250 that can also be pivoted in any direction coaxially with the camera 240 and has a housing 252 in which a rocket launcher and a fire control system for targeted shooting of fuel-air compression wave grenades are provided. The effect of such compression wave grenades (one compression wave grenade 260 of which is shown as an example in FIG. 7) can be freely selected through the free choice of the impact point from a warning shot until destruction of the target.

Furthermore, a sound gun, for example, an ultrasonic sound gun 254 is provided on the rear device bracket 250, by means of which the targets aimed at can be exposed to a high sonic pressure even at a greater distance.

A communication system 270 that is also provided on board the slave aircraft 2, for example, in the fuselage 200 permits communication over a data link 272 with the respective base aircraft 1.

The slave aircraft 2 can receive hydrogen and oxygen from the base aircraft 1 during flight by means of the refueling system provided in the coupling equipment. The slave aircraft 2 can return the water formed by combustion in the fuel cell through the refueling device back to the base aircraft 1.

In detail, the slave aircraft has the following additional advantages:

The slave aircraft are advantageously much more difficult to damage than the long slow parent planes and they are also advantageously equipped with both lethal and non-lethal weapons and are also equipped with means for short-range communication. They can therefore be used to advantage for near inspection of ships, with loudspeakers and remote directional microphones for acoustic communications between ships with which no radio connection has been established, such that they hover near the bridge of the ship with which there is to be communication;

in the case of armed use with a rocket launcher, which shoots fuel-air compression wave grenades with precision, for delivering warning shots and for forceful defense against pirates;

landing as an armed escort on ships that are to be protected in particular, such as passenger ships or tankers and being anchored there securely for the trip through the endangered marine region and remaining connected to the ground control station via data link;

exchanging information with the ship's crew and delivering warnings or delivering recommended evasion maneuvers from the ground control station to the ship to be protected;

searching for pirates in the environment of the ship to be protected using the on-board day and night sensors and issuing prompt warnings about attacks;

defending against pirate attacks with the on-board weapons at a sufficiently great distance under the control of the ground station, so that the ship to be protected cannot be shot on by pirates;

They can advantageously induce and briefly maintain support by slave aircraft docked on the nearest parent aircraft in the event of a pirate attack;

When there is a shortage of fuel, they can take off vertically to advantage from the ship to be protected and can fly to the next parent aircraft and be refueled during flight with solar hydrogen gas from this aircraft and can store this gas in the fuselage in a sufficient amount, the fuselage being designed as a pressurized storage tank made of UV-protected Kevlar® film which can thus be used to advantage with brief pauses in refueling until its supply of weapons has been exhausted and reloading is necessary;

The slave aircraft can dock on the nearest base aircraft after the end of a protection deployment, the towing and refueling equipment allowing refueling in air and being supportable over greater distance to the next deployment site.

In cases in which ships require special protection or for other reasons no slave aircraft launched in the air is available, a deck container may also be given to the ship to be protected, the deck container having a launching system and one or more slave aircraft that are launched when there is risk of a pirate attack, so that they can monitor the surroundings of the ship with their sensors and in the event of a pirate attack they can initiate and distribute the pirates with weapons. In doing so, the slave aircraft stationed on the ship is connected to a ground control station via a data link, the slave aircraft being remote controlled from this ground control station and also being remote controlled and remote operated. After deployment, the slave aircraft can again be refueled automatically and its ammunition replenished.

In a deployment fleet of a system according to the invention, a plurality of base aircraft 1 each being equipped with a slave aircraft 2, but with different sensor equipment, namely PD marine radar base aircraft 300 (FIG. 8) that may be equipped with a pulse Doppler marine radar unit 310 and each of which has a 2 m radar transceiver antenna 312 which is pivotable 360° in the horizontal plane wherein the radar antenna 312 is accommodated in the fuselage designed as a radome 314. The radar antenna thus has a 360° free field of site from the horizon to 30° below the horizon and a small dead angle at the tail end drive motor. Furthermore, the PD marine radar base aircraft 300 is equipped with a 0.5 m data link antenna 316 by which data is exchanged with the slave aircraft and with a data link base aircraft 540, which is serving as the relay station, to a ground control station 350.

Precision radar altimeter base aircraft 400 (FIGS. 11 and 13), each equipped with a 2 m radar transceiver antenna with signal separation preferably equipped for 35 GHz FMCW operation with a 350 MHz bandwidth and a very narrow radiation lob of 0.4°, pointing vertically downward and horizontally stabilized. In addition, there is a pivotable 0.5 m data link antenna for data exchange with the slave aircraft and a data link base aircraft serving as a relay station.

Figure 9:
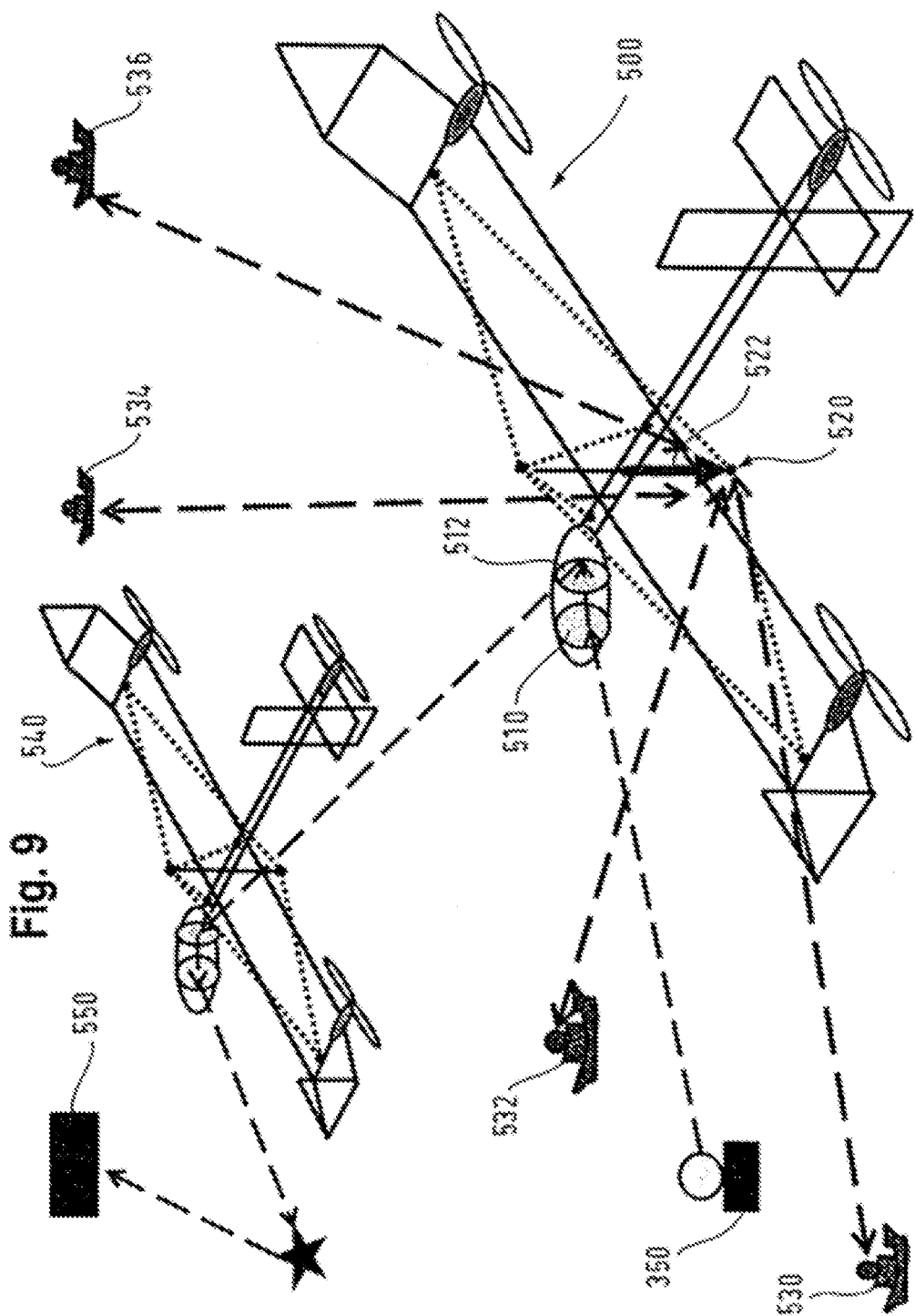
FIG. 9 shows a schematic diagram of a system according to the invention as a base station for AIS (automatic identification system) for ships.

Data link base aircraft 500 (FIG. 9) each equipped with two transceiver antennas 510, 512 with a diameter of 2 meters, situated in the fuselage and pivotable 360° in the horizontal plane as in the case of a PD marine base aircraft 300. Furthermore, the data link base aircraft also have data links antennas with a 0.5 m diameter or data exchange with the slave aircraft and other base aircraft. Each data link base aircraft 500, which preferably remains at an altitude of 15 km to 20 km, also has an AIS base station 520 on board. The AIS ship identification system operates in the VHF range with frequencies of 161 MHz and 162 MHz. The system consists of an interrogator in a base station equipped with a YAGI directional antenna 522 with a length amounting four times the wavelength of 1.85 m, i.e., 7.4 m, which can be aimed by directing the aircraft 500 at the target region and thus can be pivoted 360° around the horizon. This YAGI antenna can be installed in the interior of the fuselage, for example, in the hydrogen tank provided there, in the direction of flight. On the back, the antenna is capped by a reflector of wire mesh to obtain a small back lobe. The antenna lobe toward the front is approx. 40° wide and has an antenna gain of 15 dB. In addition, the AIS base station 520 has a receiver that receives all the transponder responses and records them and then relays them to the vessel tracking optionally via additional relay aircraft 540 to a central AIS office 550. A transponder is provided on each of the target ships to be queried 530, 532, 534, 536, such that the ship position data and the ship passage data, for example, the cargo, the crew size, the draft and the ports of origin and destination are sent by the transponder back to the interrogator in response to interrogation. The transponder response is emitted using a 360° antenna and can be received by all AIS-equipped ships within the range of the horizon (approx. 20 to 30 nautical miles) and used to prevent a collision after being analyzed on a display screen similar to a radar screen.

Figure 10:
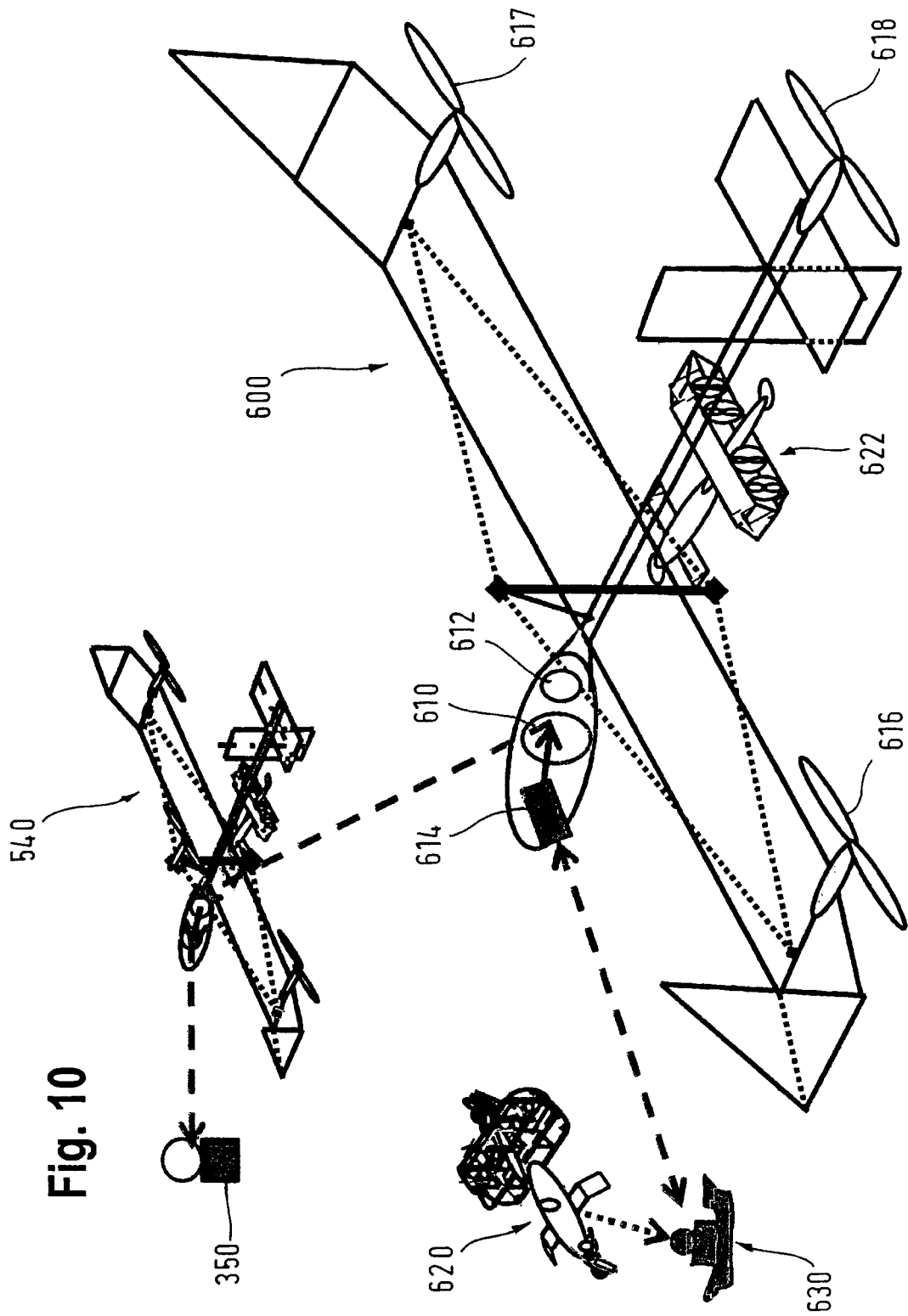
FIG. 10 shows a schematic diagram of a system according to the invention equipped with a multispectral telescopic camera with a nighttime floodlight.

Multispectral sensor base aircraft 600 (FIG. 10) each carries a 2 m data link transceiver antenna 610 which is pivotable by 360° in the horizontal and is also mounted in the fuselage which is preferably constructed of Kevlar® film. This antenna thus has a free field of vision from the horizon to 30° below the horizon with a small dead angle at the telescope in the fuselage. The data link antenna 610 serves to provide data exchange with a data link base aircraft 500 operating as a relay station. Another 0.5 m data link antenna 612 is provided for data exchange with the slave aircraft 620, 622. These multispectral sensor base aircraft 600 are each equipped with at least one near infrared telecamera 614 with which multispectral image recordings can be made of ships 630. One particular feature of these multispectral sensor base aircraft is their special propeller construction with large propellers 616, 617, 618 which are equipped with flapping hinges, so that these multispectral sensor base aircraft 600 can fly with minimal vibration.

A complete deployment group thus comprises the following drones and is operated and guided as follows during deployment:

Twelve base aircraft of the four types: radar base aircraft, data link base aircraft, multispectral sensor base aircraft, precision radar altimeter base aircraft, Twelve armed slave aircraft capable of hovering that are also brought along, The base aircraft can stay in the air for a practically unlimited length of time due to solar power production and storage in the form of solar hydrogen during flight and mutual air-to-air refueling.

Multiple deployment groups are guided from one or more command and control ground stations during deployment and are flown and operated by remote control pilots and the sensor and weapons operators from the ground station. Thus, each individual aircraft is at all times and under all conditions under the control of the pilots and operators of the ground station.

If there is an interruption in the data link a security program is initiated, taking the respective aircraft to a high altitude and guiding it into a secure flying state until a data link can be reestablished. If the link cannot be restored, the safety control attempts to establish a narrow band connection to the ground control station via satellite radio and to obtain additional instructions there. If this also continues to be defective, the aircraft can automatically return to an emergency landing station within range while emitting emergency signals if the GPS INS navigation system is still functioning. If this is impossible the aircraft is brought over unpopulated territory where it is crashed and destroyed.

The ground station 350 is connected by its own broadband data link to all aircraft for the command and data exchange in real time via the data link base aircraft. A distance of 300 km to 400 km can be bridged here with a relay aircraft using the data link according to the invention at a high data transmission rate toward any side in the direction of the antenna. In special cases the connection may bridge up to 800 km in one transmission at a corresponding flying altitude and a greatly reduced data rate.

For monitoring large marine areas, multiple deployment groups may be used in coordination and can then monitor large areas. The coast around the entire Horn of Africa from Djibouti to Mombasa, for example, might be secured completely with 15 deployment groups. These 15 deployment groups would not cost any more than a single maritime patrol aircraft and could be guided from two frigates with ground control stations on board.

Figure 11:
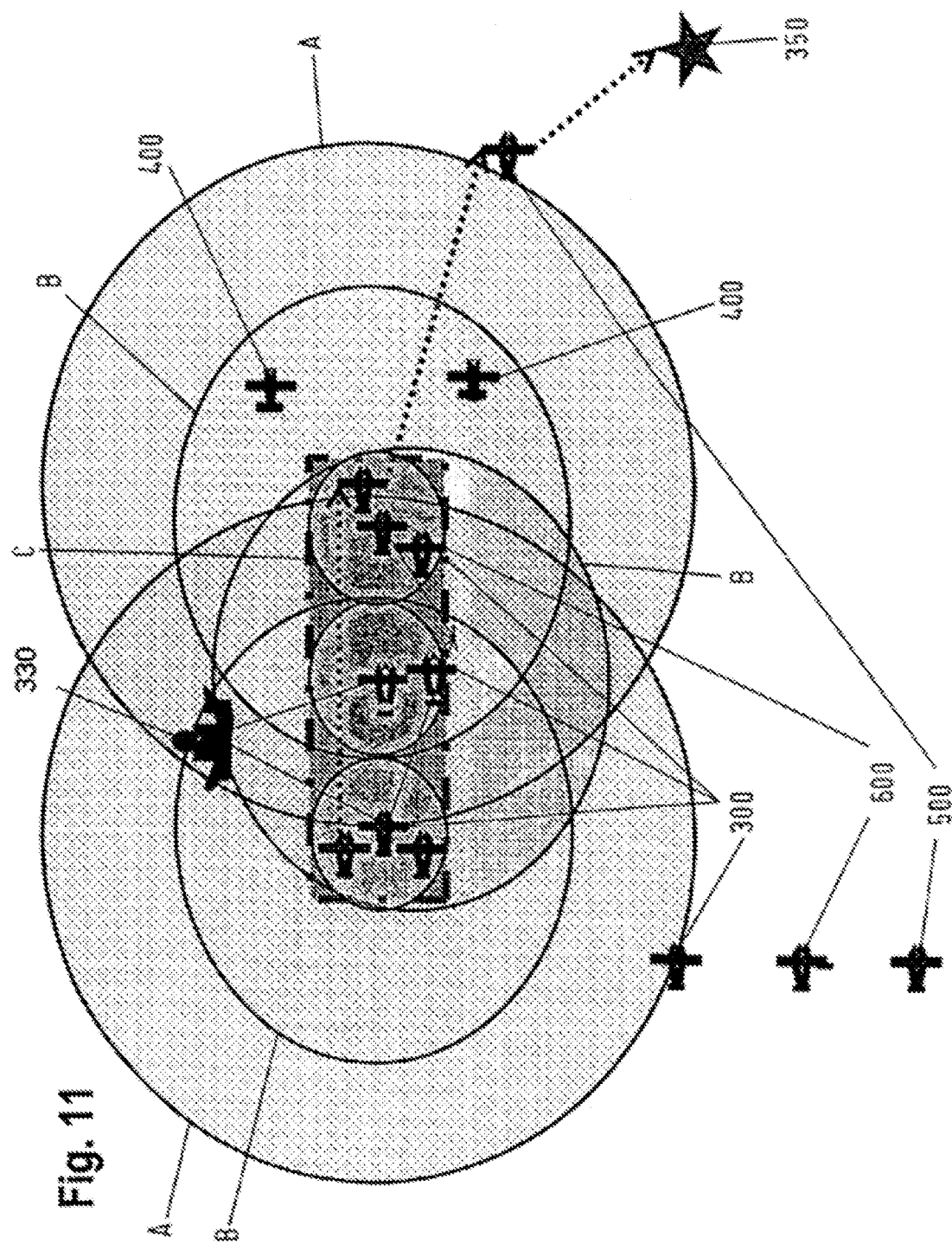
FIG. 11 shows a schematic diagram of the deployment tactics of a fleet of aircraft of the system according to the invention.

A deployment group in normal deployment will assume the tactical formation shown in FIG. 11 to create a secure area above the internal protected area.

The forefield of the protection zones is monitored by at least two high-flying data link base aircraft 540 as AIS base stations 520 with interrogator transmitters, which expand the function of the AIS system beyond the high seas to a distance of 500 km from the convoy and interrogate all ships 330 with activated AIS transponders, relaying their positions, course and speeds and their ship passage data to the ground control station 350 and creating in the ground control station an extensive tracking file with all known ships and ship passage data.

An external protection zone 500 km long and 280 km wide is created by at least three PD radar stations formed by PD marine radar base aircraft 300 at a high altitude, so that within this zone each ship's destination is located with pulse Doppler radar from two different directions, so that each object moving at a low minimum velocity is discovered regardless of its direction of travel even under all-weather conditions.

At least two high-flying base aircraft 400 with imaging monopulse precision radar altimeters are moving at the forefront of the radar protection zone A and fly over each ship that is entering the outer protection zone B and has not been unambiguously identified and they measure its radar height signature above ground. This information is compared with a reference signature kept in an identification database using an automatic image recognition system, thus permitting counterfeit-proof identification of each known larger ship.

An internal protection zone C 280 km long and 100 km wide, for example, is created by at least three high-flying base aircraft 600 using multispectral telescopic cameras 614, such that this zone is scanned visually continuously for the penetration of small boats with low radar visibility with adequate visibility conditions at the periphery and all the ships entering this internal zone are visually identified with their multispectral image signature by means of an automatic image recognition system by comparison with a reference signature kept on file in a counterfeit-proof manner and their behavior is monitored continuously and this zone is searched continuously by radar altimeter under poor visibility conditions to detect the penetration of small boats having low radar visibility, and all ships entering the internal zone are identified by radar altimeter and their behavior is monitored, and all ships within the internal protection zone are monitored continuously, either visually or by radar altimeter, for suspicious or threatening behavior, so that imminent pirate attacks can be detected early, and unidentified or suspicious ships are pursued by an armed escort and armed slave aircraft can come to the aid of attacked or endangered ships within less than 10 minutes, a complete tracking file and a complete identification file of all marine craft detected can be created over the entire protection range under the control of a manned ground station and the results compared with AIS data, and to observe all ships and identify them or clarify their intention, so that imminent pirate attacks can be detected promptly and prevented.

With this maritime surveillance system according to the invention, it is advantageously possible to operate all remote controlled unmanned aircraft for an unlimited period of time and inexpensively in the entire protection range of the region to be surveilled by using solar hydrogen gas generated by the solar systems on the base aircraft. The solar hydrogen can be transferred by air-to-air refueling of the base aircraft among one another and for refueling the slave aircraft.

The base aircraft of the deployment group can advantageously perform the following individual missions:

Expanding the AIS range of operation from the coastal waters to the high seas and beyond, Long-term deployment of slave aircraft in and around the deployment area during idle times.

Collecting energy in the form of hydrogen gas in energy-saving slow flight at a low altitude, and Air-to-air refueling of the base aircraft and of the slave aircraft which have a lower energy demand than their on-board solar system can supply.

Radar maritime surveillance from an altitude of more than 13 km in an area with a diameter up to 150 km.

Automatic identification of ships from AIS or radar contacts through a closed cloud cover using the precision rate or altimeter and an automatic analysis system.

Optical imaging multispectral maritime monitoring, observation and automatic identification of ships at a distance of up to 40 km with ground visibility.

Data link of all participants in the deployment group and the ground control stations and the AIS central office.

Possibility of mere inspection and contact with the crew of unidentified ships and graduated armed defense against pirate raids with the slave aircraft.

With this maritime surveillance system according to the invention, it is also possible to provide a system of aircraft according to the invention, which are capable of long-term surveillance of the maritime shipping routes to be protected by using a suitable deployment method according to the invention and can defend against pirate raids using suitable means. A fleet of aircraft under the control of one or more command ground stations, having the following additional advantages in detail, is preferably to be made available for this purpose:

- The ground and the air space near the ground can be monitored by using solar energy with practically unlimited flying time and
- The solar-driven high-altitude flight can be maintained day and night in summer and winter, with practically unlimited lifetime and with a high payload capacity (for example, 30%) of the flying weight.
- Members of the deployment group with a good power supply and low power consumption can refuel members having high energy consumption with hydrogen gas in air.
- It is suitable for use as a radar base aircraft and is capable of carrying three pulse Doppler radar sensor equipment units according to the invention per deployment group, each having a 2 m antenna per aircraft, for example, in continuous deployment and is capable of operating with full data connection to the ground station and also capable of finding, locating and tracking the course of even smaller target ships, for example, fishing boats or wooden dhows with a small radar cross section over great distances of 150 km, for example.
- It is suitable as a radar altimeter base aircraft and is capable of carrying three radar altimeter sensor equipment units according to the invention per deployment group, each having, for example, a 2 m transceiver antenna per aircraft in constant deployment and in full data connection with the ground station and with AIS; it is also capable of tracking and localizing in the fleet even smaller target ships, for example, fishing cutters or wooden dhows with a small radar cross section RCS from a high altitude above the clouds, identifying a reference signature if available and tracking their course even in poor weather without ground visibility. It is also capable of preparing reference signatures of all ships entering the surveillance area and transmitting them to the ground station to supplement the tracking files.
- It is suitable and capable of controlling the sensor use in accordance with the ground station through an on-board computer and conducting automatic preliminary analysis on board in association with the other sensors of the deployment group, so that the load on the data link is minimized.
- It is suitable as a camera base aircraft and is capable of carrying and operating three optical multispectral sensor equipment units according to the invention, each having, for example, a 35 cm lens and a 2 m data link antenna per aircraft, also capable of tracking, localizing and identifying small target ships, for example, skiffs or dinghies over great distances of 40 km, for example, by day and 20 km at night. It is suitable and capable of controlling the sensor use in accordance with the ground station through an on-board computer and conducting an automatic preliminary analysis on board in association with the other sensors of the deployment groups, so that the burden on the data link is minimized.
- It is also capable of preparing optical multispectral reference signatures of all ships entering the surveillance region and forwarding them to the ground station for supplementing the tracking files.
- It is suitable and capable of transmitting the sensor information picked up in compressed form in real time over its own data link with a 2 m antenna to the next data link relay or to the ground station to the remote control pilots and sensor operators for analysis and to receive command signals and control signals from the ground station and to execute them with little delay in real time.
- It is suitable and capable of carrying a slave aircraft equipped with weapons with all members of the deployment group, bringing them to deployment through air launching and taking them in tow again after deployment
- It is suitable and capable as a data link base aircraft of carrying a data link system having two independent 2 m remote directional antennas that can be pivoted 360° for each base aircraft and bringing them to deployment and additionally establishing a data transmission to the nearby radar base aircraft and to the nearby slave aircraft via a smaller independently movable communication antenna.
- As a slave aircraft it is suitable and capable of employing equipment according to the invention with weapons, namely an ultrasonic sound gun and a rocket launcher, which can be used in a precisely targeted manner due to the built-in 360° pivotable zoom video camera with a laser range finder and a built-in fire control system, for anti-terror deployment and anti-pirate deployment for warning and for combating attacking groups with a short range (100 m to 1000 m).
- Due to the use of slave aircraft with special flying properties such as slow flight and hover flight and VLTO, this permits the use of weapons and the use of acoustic nearby communication means.
- As a slave aircraft it is suitable and capable of landing vertically on prepared surfaces on ships that have requested special protection and being anchored there up to weather conditions with rough seas 4 and constantly monitoring the ship's environment and promptly detecting incipient pirate raids.
- It can defend against detected pirate raids through suitable weaponry equipment at a great enough distance under the control of the marine ground control station, so that the ship to be protected can be defended from attack by pirates.
- The ship's crew to be protected can be warned promptly about critical situations via a data link to the ship to be protected under the control of the ground control station and they can be advised and an escape route, for example, may be recommended in unclear situations.
- As the weapons carrier it can be remote controlled by pilot as well as sensor and weapons operators in the ground control station with a fast response over the data link connection.
- Sensor values, for example, target images or sounds or speech picked up by directional microphones or target distances measured by the laser range finder can be transmitted to the ground control station and these sensor values can be analyzed there by image analyzers and automatic analysis equipment and can be used for effective deployment of the slave aircraft.

It can be used in a targeted manner by the tactical deployment controllers with a rapid response adapted to the situation, based on sensor information transmitted without a time lag.

The cost per aircraft can advantageously be kept so low due to the use of solar-operated base aircraft that a large fleet of 15 deployment groups, for example, can still be economical as would be necessary for protecting the maritime shipping routes around the Horn of Africa from pirate raids, for example. The cost of the drones in the 15 deployment groups would correspond approximately to the cost of a single marine patrol aircraft but the 15 deployment groups could effectively monitor a much larger marine area and protect it from pirate raids.

Figure 8:
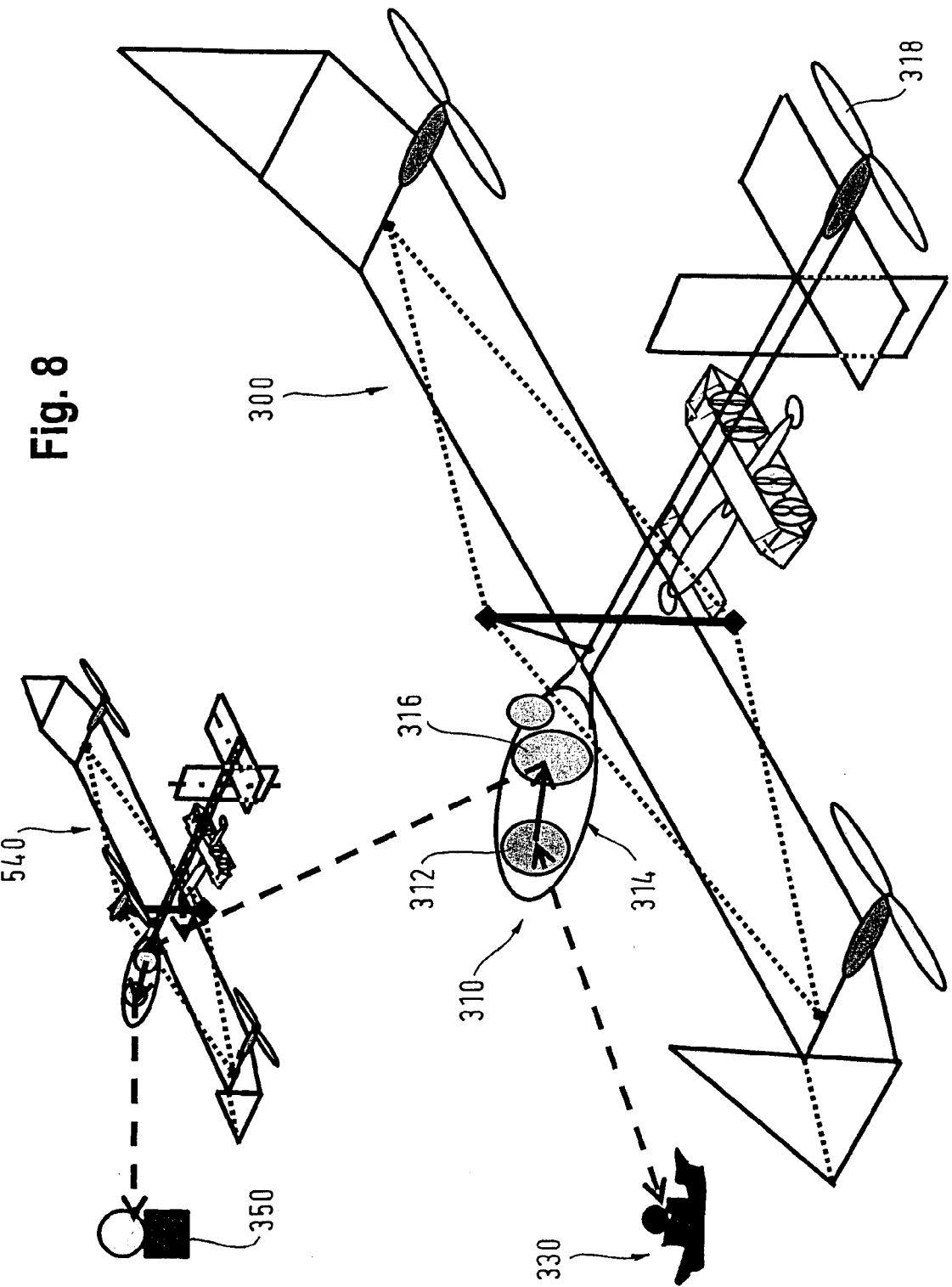
FIG. 8 shows a schematic diagram of a system according to the invention equipped with a pulse Doppler radar system.
Figure 12:
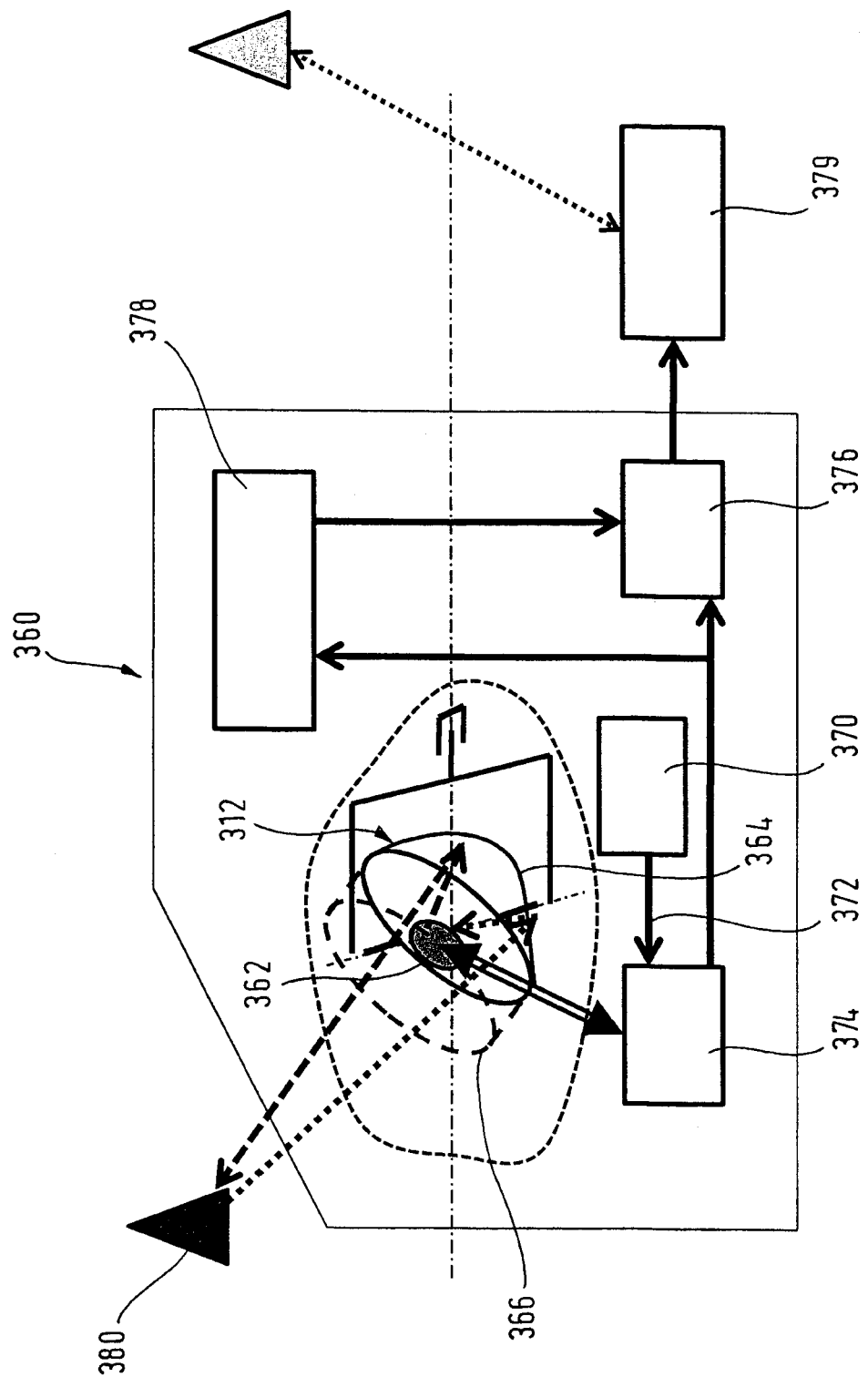
FIG. 12 shows a schematic diagram of the functioning of a pulse Doppler marine radar.

With reference to FIG. 12, the pulse Doppler radar sensor 360 used in the PD marine radar base aircraft 300 shown in FIG. 8 is described below. The radar is a medium pulse repetition frequency pulse Doppler radar system and operates with coherent integration of at least 50 pules per burst. It also operates with pulse compression by a factor of at least 100. The radar unit uses an antenna 312 with a very large diameter and thus a very high antenna gain. The antenna 312 has a directional diagram with very small side lobes (less than −40 dB for the first side lobe). This is achieved by the use of an antenna feed horn 362 with an irradiance that declines in the form of a cosine outwardly and by the use of a parabolic main dish antenna 364 whose outer edge carries a wing tip edge 366 of a radar beam absorbing material whose wave resistance is balanced, so that there is a minimal overflow of the illumination energy of the parabolic main dish antenna 364 and the antenna therefore has very small side lobes (less than −40 dB). The illumination of the target with the antenna 312 is from above at a steep enough angle (more than 5°) with a very narrow main lobe (less than 1.8°). This limits the main lobe wave clutter to a narrow velocity range and keeps the received main lobe wave interference at relatively low levels, which are not reached by radar of the conventional designs. The detection results are therefore better than the results achieved with conventional radar.

The small side lobes of antenna 312 receive only a relatively minor side lobe wave interference from the reflected transmission signal because the first side lobe lies on the ground only in a very narrow range due to the steep viewing angle and receives interference from there.

The actual Doppler speed distribution and the amplitude of the received wave clutter is measured continuously and recorded, while in parallel with that, the detection threshold values for detection of the target vessels are adjusted adaptively to the waves actually occurring, so that the measured wave clutter cannot be mixed up with the measured target vessel echoes actually moving. Therefore, the best possible detection results are achieved with each draft.

At least two such radars that illuminate the target at an angle of 60° to 120° are always used. The result is that the target is not observed in the tangential direction with the drone's own direction of travel from at least one sensor and thus the Doppler signal and with it the target vessel always remain visible in the radar.

With this maritime surveillance system according to the invention, having the pulse Doppler radar sensor shown in FIG. 12, it is possible to observe the outer protection area A (FIG. 11) in the area to be monitored with Doppler radar from two directions and to locate each object from at least two directions, so that location of each moving ship independently of its direction of travel is made possible with Doppler radar even at a high draft.

The equipment of the radar aircraft advantageously consists of the pulse Doppler radar 360, which is shown in FIG. 12 and advantageously operates with a medium pulse repetition frequency. The high-frequency energy, with a frequency of preferably 6 GHz for illumination of the target, is generated by a waveform generator 370 and is distributed via a hollow conductor 372 over the high frequency transceiver part 374 and the feed horn 362 to the parabolic transceiver antenna 312. The antenna 312 is aimed at the target 380 being sought and is aimed at the target and/or scans the target area line by line like a grid. For illumination of a field in the scan raster, a pulse packet of advantageously eight pulse trains, each having 50 pulses, is transmitted as the waveform. The pulse repetition frequency within the eight pulse trains is advantageously started from 8 kHz to 17 kHz, so the range finder operates from 40 km to 150 km. Each pulse of a pulse train is coherent, so that it is preferably possible to integrate over the 50 pulses of a pulse train in the analysis, which advantageously leads to a corresponding improvement in the signal-to-noise ratio. In addition, a pulse compression is advantageously performed by a factor of 100 to concentrate as much energy as possible at a grid field at a low transmission power. In addition, each pulse train is emitted with a slightly altered transmission frequency in comparison with the standard transmission frequency of preferably 6 GHz. Therefore, randomly distributed clutter can be differentiated from moving waves due to real target ship echoes more effectively. The required radar output power is advantageously coordinated through the use of the very large radar transceiver antenna 312 with a diameter of 2 meters and in one embodiment with a wing tip edge 366 made of radar-absorbent material whose characteristic wave impedance is adjusted so that the antenna diagram has very small side lobes with which in turn very small side lobes are emitted and received, and having a gain of advantageously more than 18,000 due to the antenna diameter of 2 meters down to 100 W to 500 W, which is a very low value for this range, depending on the operating mode, which can also be supplied with solar energy. Each PD marine radar base aircraft advantageously also uses its droplet-shaped fuselage 314 made of thin Kevlar® film, which also serves as a hydrogen gas tank, as a radome advantageously with a diameter of 2.5 meters and carries suspended therein the 2 meter diameter radar transceiver antenna 312 in the interior of the fuselage. The antenna is advantageously pivotable by 360° in the horizontal, has a free field of vision of 360° due to the fuselage being used as a radome and has a free field of vision from the horizon to 30° below the horizon with a small dead angle when the drive propeller 318 is in the tail (FIG. 8).

In observation of each grid field of the scanning grid in the radar search field advantageously three radar units 360 work together. These units are positioned, so that at least two radar units see the target from different directions. Therefore, a moving target can never move tangentially in relation to all radar units and is thus invisible with a diminishing radial speed for the radar. In addition, several simple radar camouflage options for ships based on camouflage in only one direction of observation can now be discovered due to simultaneous observation from multiple directions.

The radar echo is advantageously received with the large reception antenna 312 and the small side lobes and is analyzed in the radar receiver 374 and in the downstream signal processing in a signal processing processor 376 with the help of a wave clutter filter process 378, and targets that are discovered are relayed to a tracking file processor 379 where a complete file of all the targets discovered and their positions, speeds and directions of travel is created and maintained over the entire duration of the deployment. The radar is therefore equipped with a device that allows a statistical distribution of the intensity of the wave clutter to be compiled on the basis of the Doppler shift exhibited by the traveling speed of the waves in the case of the selected direction of observation with more than a 5° angle of inclination and the selected antenna beam opening angle of advantageously 1.5°. If this distribution is assumed to be the lower threshold value for a valid discovery of a target in the discovery logic unit, then the result is advantageously a filter circuit that is always automatically adapted optimally to the prevailing draft at the moment and thus advantageously achieves the best possible detection results of the radar under all draft conditions by displaying valid radar targets and detecting and eliminating wave clutter on the basis of the measured wave clutter characteristic.

A target tracking memory that operates continuously is created on board the PD marine radar base aircraft in the tracking file processor 379 for all detections, and target tracks are created. The results of the target tracking memory are relayed via a near data link with a 0.5 m antenna to the next data link base aircraft and from there to the ground control station. Within a deployment group, all the radar units exchange their target data via data link and perform a data fusion in the tracking file processor 379, so that a shared target database is advantageously created, containing all the information on a deployment group. This target database is then transmitted by data link to the ground control station.

To do so, the radar aircraft of the deployment group must advantageously be able to execute the following deployment procedure in order to advantageously bring the radar sensors to deployment:

A continuous course tracking of larger ships (larger in size than fishing cutters or wooden dhows) with three PD marine radar base aircraft 300 per deployment group in an outer protection area B (FIG. 11) that is 280 km wide and 500 km long with marine radar under all weather conditions. The outer protection area A includes a fully protected inner protection area C (FIG. 11) that is 240 km long and 80 km wide, in which each target ship 330 (FIG. 11) is advantageously detected from two sides, such that the lines of sight are at least 60° and at most 120° apart from one another. These marine targets should advantageously be detected with the radar from above with a line-of-sight inclination steeper than 5° in order to utilize the better radar visibility of ships from above in particular at a higher draft. This requires a flying altitude of 13 to 15 km with a maximum search distance of 150 km A mutual exchange of search results of the radar sensors and multispectral sensors within the deployment group according to FIG. 11 and to the ground station 350 through the three data link base aircraft and transmission of the control commands to the deployment group.

The equipment of the PD marine radar base aircraft 300 advantageously consists of the pulse Doppler radar that operates with the medium pulse repetition frequency (MPRF) and transmits a pulse packet of preferably eight pulse trains each having 50 pulses for the illumination of a field in the scanning grid, each as a waveform. The pulse repetition frequency within the eight pulse trains is advantageously staggered from 8 kHz to 17 kHz, so that the distinct range finding of the radar advantageously operates from 40 km to 150 km. The pulses of a pulse train are each coherent, so that in the analysis, the integration may preferably be performed over the 50 pulses of one pulse train, which leads to a corresponding improvement in the signal-to-noise ratio. In addition pulse compression by a factor of 100 is performed to concentrate advantageously as much energy as possible on one grid field at a low transmission power.

In addition, each pulse train is emitted with a slightly altered transmission frequency in comparison with the standard transmission frequency of preferably 6 GHz. Therefore, randomly distributed clutter can be differentiated better from moving waves from real target ship echoes in an advantageous manner. The required radar transmission power is kept according to the invention at the very low value of 100 W to 500 W, depending on the operating mode; this value is very low for this range and can also be supplied with solar energy through the use of a very large radar transceiver antenna with a gain of preferably more than 18,000.

Each radar aircraft advantageously uses its droplet-shaped fuselage which is made of thin Kevlar® film and also serves as a hydrogen gas tank, as a radome, preferably with a diameter of 2.5 m, and carries a 2 m diameter radar transceiver antenna in the interior of the fuselage. The antenna can be pivoted by 360° in the horizontal, has a 360° free field of vision due to the use of the fuselage as a radome and advantageously has a free field of vision from the horizon to 30° below the horizon with a small dead angle at the drive motor in the tail. In observation of each grid field of the scanning grid, three radar units advantageously work together. These units are positioned so that at least two radar units can see the target from different directions. Therefore, a moving target can never move tangentially in relation to all the radar units and thus be invisible for the radar with a diminishing radar speed. In addition, due to the simultaneous observation from multiple directions, some simple radar camouflage options for ships based on camouflage in only one direction of observation can be discovered.

The radar is also equipped with a device which, at the selected observation direction with advantageously more than a 5° angle of inclination and the selected narrow antenna beam opening angle of 1.5°, allows the formulation of a statistical distribution of the intensity of the wave clutter over the Doppler shift that indicates the traveling speed of the wave during operation continuously for the marine area being observed at that moment. If this distribution is assumed as the lower threshold value for a final detection of a target in the detection logic unit, this advantageously yields a filter circuit that is always automatically optimally adapted to the currently prevailing draft and thus advantageously achieves the best possible detection results of the radar under all draft conditions.

A continuously operating target tracking file is created for the memory from all objects detected and tracking lanes on board the PD marine radar base aircraft. The data is relayed from the target tracking memory to the next data link base aircraft via a near data link with a 0.5 m antenna. Within each deployment group, all the radar units exchange target data with one another and with the ground control station and perform a data fusion, which creates a shared target database containing all the information for a given deployment group. This fused target database is then transmitted with the help of the long-range data link system to the ground control station.

Figure 13:
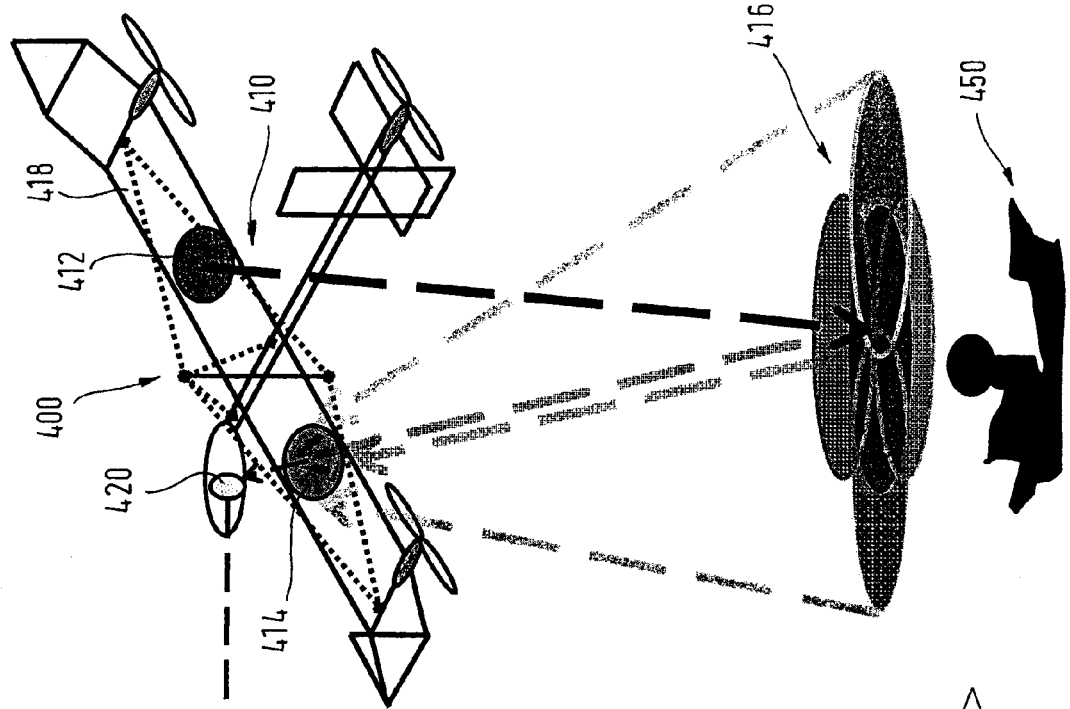
FIG. 13 shows a schematic diagram of a precision radar altimeter used with the system according to the present invention.

The imaging monopulse precision radar altimeter provided in the precision radar altimeter base aircraft and the signature formation and signature image detection performed therewith are explained in greater detail below with reference to FIG. 13.

The monopulse precision radar altimeter operates according to the frequency modulated continuous wave method (FMCW) and is equipped with a transmitting antenna and a monopulse perception antenna group isolated from the former by signal technology. The transmitter operates at a minimum of 35 GHz and sends a chirp signal with a frequency stroke of at least 350 MHz and a pulse period of at least 20 μsec with a pulse repetition frequency of at least 1000 Hz. The four channel FWCM receiver operates with a dwell time of at least 100 milliseconds and can receive 100 pulses and integrate them incoherently in this period of time. The parabolic transceiver antennas each have a diameter of at least 1.2 m and a beam lobe width of max. 0.41°. From a flying altitude of 20 km, the transmitting antenna on the ground has a beam diameter of max. 150 meters. From a flying height of 20 km the monopulse receiving antenna group has a horizontal position resolution of at least 7 meters. The receiver can be integrated incoherently over at least 100 pulses. The receiver can create range gates with a length of 0.3 m in each monopulse channel, extending from the surface of the ocean to 30 meters above and record the echo received in each case with the received intensity. The receiver can form the total signal and the differential signal of the respective monopulse channels that belong together for each range gate and can calculate and plot from this the position of the focal point of the echo in two orthogonal axes in each gate separately in the horizontal plane. The analyzing computer can generate a standardized signature for each position of the transmission beam containing at least two echoes, and this signature can be used as a coordinate system in the horizontal plane as the X axis, which uses the fitted lines weighted with the intensity through the focal points of all echoes from the range gate, directed like the velocity vector of the radar target. The Y axis thus forms a right-handed coordinate system and passes through the focal points of all measured echoes from the range gates. The analyzing computer generates a feature vector for each signature containing the following components:

a. Number of the range gate
b. X coordinate of the echo
c. Y coordinate of the echo
d. Intensity of the echo The analyzing computer can compare targets measured with the feature vectors with reference targets saved in a database by forming and analyzing the absolute value of the differences between the feature vectors and can recognize targets measured in this way as being in agreement with a certain reference target and thus identify the measured target.

The equipment and the method of operation and deployment of the monopulse precision radar altimeter provided in a monopulse precision radar altimeter base aircraft 400 are described below.

With the maritime surveillance system according to the invention, it is possible to observe vertically from above at a high altitude of 20 km, for example, target ships which have been detected by AIS inquiry via their transponder response and whose position, course and speed have been verified by Doppler radar and it is possible to record a radar height signature from the ship that also measures and records the relative position of the focal point of the echo in two direction for each altitude layer above via the four monopulse reception channels of the radar altimeter in addition to measuring and recording the echo intensity for each altitude layer (range gate).

This radar height signature is recorded, for example, for 100 layers each with a height of 0.3 m and supplies a very accurate signature of a ship that can be used for secure identification of the ship in question with an automatic image recognition method if a reference signature of the ship in question is found.

The reference radar ship signatures are ideally saved in a database together with the AIS identifying code of the ship and can then be located rapidly after an AIS query. The reference signatures are advantageously recorded at the time of the initial entry of the respective AIS ship into the scope of operation of the maritime surveillance system, with announcement and verification of the AIS identifying code in a counterfeit-proof process.

Figure 15:
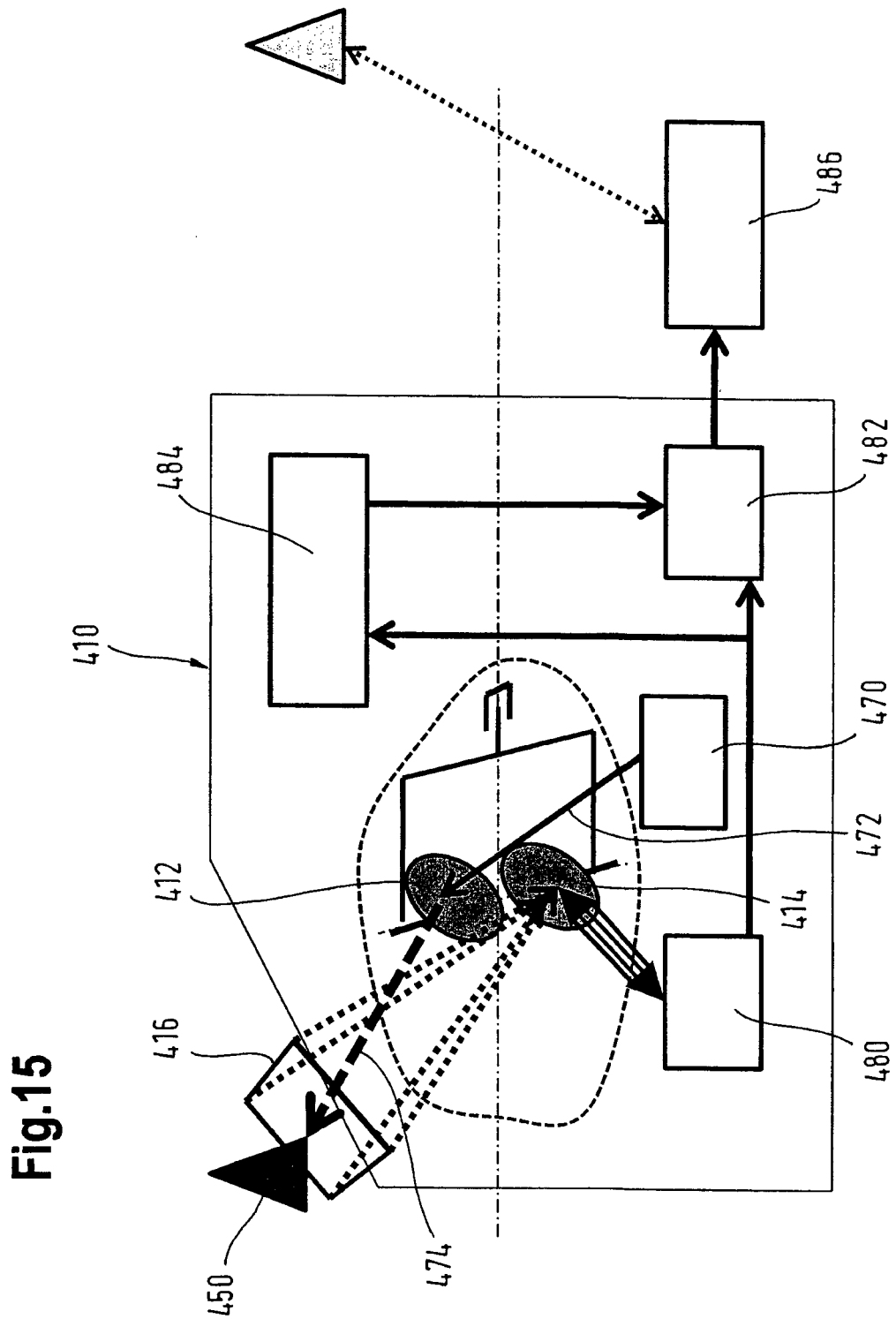
FIG. 15 shows a schematic diagram of an imaging monopulse FMCW precision radar altimeter used in the system according to the invention.

The equipment of the monopulse precision radar altimeter base aircraft 400 has a monopulse precision radar altimeter 410 that operates with a frequency modulating continuous wave method using a transmitting antenna and a four-reception lobe monopulse receiving system. The FMCW high-frequency energy with a frequency of 35 Hz and a superimposed chirp signal of 350 MHz bandwidth for illuminating the target is generated by a waveform generator 470 (FIG. 15) and distributed via a hollow conductor 472 to an on-board high-frequency transmitting antenna 412 and emitted in the direction of the target 450 in a transmission lobe 474. The radar beam is reflected from the target 450 back to a reception antenna 414 on board the aircraft 400. The reception antenna 414 has four reception lobes 416, which are arranged so they are offset relative to one another in a cross pattern and together form a four-channel monopulse reception antenna.

Figure 14:
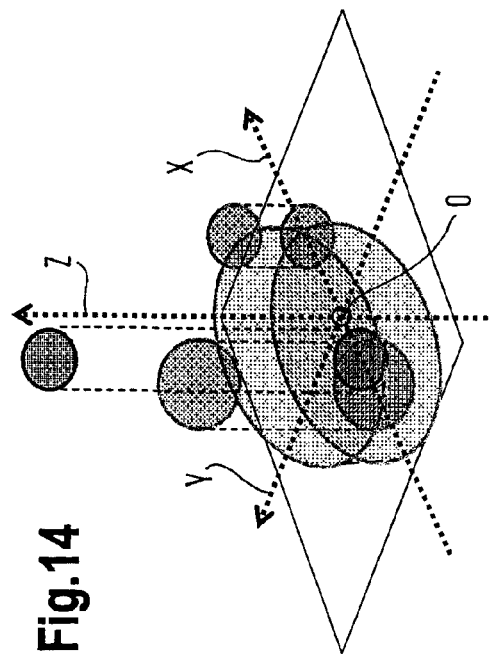
FIG. 14 shows a schematic diagram of the functioning of the precision radar altimeter from FIG. 13.

By forming the totals and the differences of the four antenna signals in the reception part 480, the relative position in two mutually perpendicular axes X and Y of the individual range gate echoes to the RCS total focal point O can be measured in each range gate (height axis Z in FIG. 14). The X axis points in the direction of travel of the ship. The radar height signature of the ship, preferably recorded over all 100 range gates, max. 200, yields a forgery-proof description of a ship and allows an unambiguous identification of a ship for which a reference signature is available. The monopulse precision radar altimeter base aircraft 400 must fly directly over the target ship 450 at a high altitude for the identification. It scans the target region according to the specifications of AIS and Doppler radar for targets that must be identified or monitored.

For the illumination of a search field of a diameter of advantageously 150 m, an FWCM packet of 100 pulses, each with 350 MHz linear chirp frequency modulation per transmission pulse with a length of 20 μsec, is transmitted as the waveform. The required radar beam transmission power is achieved by using a very large radar transmitting antenna 412 and a very large reception antenna 414, each with a diameter of 1.2 m and in a design with a wing tip made of radar absorbing material whose characteristic wave impedance is adjusted, so that the antenna diagram has very small side lobes. The radar signal can thus be emitted and received with very small side lobes. In addition, very small side lobes can also be achieved with a cosine-shaped amplitude modulation of the transceiver horns over the antenna diameter and can be kept at the very low value of 5 W to 10 W, depending on the operating mode, this being very low for this range, due to the antenna diameter of 1.2 m and with a gain of advantageously more than 100,000. This energy demand can easily be met with solar energy.

Each monopulse precision radar altimeter base aircraft 400 also uses its wing 418 of thin Kevlar® film as a radome for the horizontally installed transceiver antennas 412, 414. The antennas are advantageously pivotable by 5° in the horizontal for vertical stabilization of the antenna axis. An image comparison of all reference radar height signatures in question from a reference radar height signature database 484 is preferably conducted with the ship signatures just measured, and the ship with the best match is identified by automatic image recognition software in an identity file processor 482, preferably on board the monopulse precision radar altimeter base aircraft 400. The identity values thereby found are linked to the tracking data and optionally additional data that may be used for identification, such as the draft of the ship that is preferably also measured and its AIS data transmitted and thus a continuous target identification and target tracking memory is prepared from all the objects detected and tracking traces and identity profiles are generated. These results of the target tracking memory are relayed over a near data link with an on-board 0.5 m data link antenna 420 to the nearest data link base aircraft 460 and from there to the on-board control station 350.

Within a deployment group, all radars, AIS basic aircraft and radar altimeter aircraft exchange their target data via data link and perform a data fusion in the track file process 486, thus advantageously resulting in a shared target database containing all the information on a deployment route. This target database is then transmitted via data link to the ground control station 350.

To do so, the radar altimeter aircraft of the deployment group must be able to execute the following deployment procedures in order to bring the radar altimeter sensors into deployment:

A continuous observation of suspicious larger ships (size larger than fishing cutters or dhows) with two to three monopulse precision radar altimeter base aircraft 400 per deployment group in an external protection area B that is 280 km wide and 500 km long at short intervals with the imaging precision radar altimeter under all weather conditions, so that suspicious manipulations on decks of a vessel indicating that a dinghy is being lowered and launched from the ship can be observed and thus preparations for an attack by pirates can be discovered promptly.

The outer protection area B includes a fully protected inner protection area C with a length of 240 km and a width of 80 km, in which each suspicious target ship 330 is advantageously observed continuously, so that preparations for an attack by pirates can be discovered and reported immediately.

All the components of this system together perform a mutual exchange of search results of the radar and multispectral sensors within the deployment group and to the ground station by the three data link base aircraft and the transmission of the coordinated control commands to the deployment group and thus make the maritime surveillance system forgery-proof and uncounterfeitable and therefore very reliable and robust.

The precision radar altimeter is suitable and capable of the following, even in bad weather without ground visibility:
detecting
localizing
identifying if there is a reference signature and
tracking the course of even small target ships, e.g., rescue boats, dinghies, skiffs, fishing cutters or wooden dhows with small radar echo in direct flight over them from a high altitude above the clouds. This precision radar altimeter is also capable of preparing reference signatures of all ships entering the surveillance area and forwarding these signatures to the ground station to supplement the identity tracking files and the reference signature database.

The same tasks can also be performed under 95% of all weather conditions, also using the multispectral EMCCD camera instead of the precision radar altimeter, and using the same method as that employed in a direct flyover.

Using the imaging precision radar altimeter or the EMCCD camera it is also possible under all weather conditions to detect any suspect
manipulations on deck of a ship indicating that a dinghy is being launched and
to observe the actual launching of the dinghy from the ship and thus
detect preparations for attacks by pirates promptly and independently of visibility and weather conditions.

With the imaging precision radar altimeter alone, the draft and the free board level of a ship can be measured directly under all weather conditions and thus additional information about the cargo status of the ship and its maneuverability can be obtained.

The imaging multispectral sensor with artificial nighttime lighting and the multispectral image processing and image recognition are described below.

With reference to the design and function of the multispectral camera for observation of remote objects by day and night, reference is made to PCT International Application No. WO 2012/103879 (which corresponds to German Patent Application 10 2011 010 334.1 of 4 Feb. 2011), the entire disclosure of which is herein expressly incorporated by reference.

Using the imaging telescope multispectral EMCCD camera system of the maritime surveillance system according to the invention, it is possible to monitor the internal protection area of a region to be surveilled using a multispectral sensor array having on-board artificial lighting with a large range (for example, more than 40 km by day and 20 km at night) at the edges of the area for penetrating small boats that cannot be picked up on radar. Using this camera system, all recognized ships can be observer continuously and sequentially in the inner area of the inner protection area and can be identified and any developing pirate raids can be discovered promptly, e.g., by recognizing the launching of dinghies without requiring the sensor aircraft to conduct time-consuming long travel routes from one search object to the next.

Therefore, constant and thorough observation of all ships in the protection area is thus possible even with heavy marine traffic. It is also especially advantageous for detecting and observing objects moving at a great distance on land or at sea if each of the camera systems of the surveillance system according to the invention has a camera equipped with a camera lens with an aperture of at least 0.3 m, with selectable focal distances of 2.5 m to optionally 22.5 m and a position stabilizing device for the camera and the camera lens. The camera is equipped with a first image sensor with a first high speed shutter assigned to it and a second image sensor with a second high speed shutter assigned to it such that the camera lens has a device comprised of optical elements for bundling incident radiation onto a radiation-sensitive surface of the first image sensor and/or the second image sensor with at least one mirror telescope arrangement and at least one target tracking mirror arrangement and is equipped with a drive unit for at least one movable element of the target tracking mirror arrangement and a control unit for the drive unit and wherein the device comprised of optical elements has a first subarray assigned to the first image sensor and comprised of optical elements with a first focal distance and a second subarray assigned to the second image sensor and comprised of optical elements with a second focal distance, the latter being shorter than the first focal distance.

It is especially advantageous if this position stabilized camera is capable of scanning an observation region by means of the element which is controlled by the control unit and is moved by the drive unit, for example, a target tracking mirror, with the image sensor assigned to the shorter focal distance in order to detect, for example, the light emitted by a ship. If an object has been detected, then an enlarged representation of the detected object can be obtained by means of the first image sensor assigned to the longer focal distance, thereby facilitating identification of the object.

To do so, the optical beam path is designed to be switchable between the first subarray and the second subarray, wherein a mirror, preferably a movable mirror, in particular a pivotable mirror, is provided for this switching.

The EMCCD image sensor preferably has a maximum sensitivity in the spectral range between 0.7 µm and 1.1 µm wavelength. In this wavelength range, an average incident power of 90 watts per m$^2$ is received from the sun in daylight operation. At this illuminance, the sensor can supply high resolution and high contrast images with a signal-to-noise ratio of more than 1000 at a distance of up to 40 km.

In addition, the earth's atmosphere has a window with a high light transmissivity in this wavelength range, so that a great visibility is possible in this spectral range.

In a preferred embodiment, the image sensor has an electrically cooled EMCCD sensor chip with a pixel size of 16 micrometers. Such a sensor chip is especially sensitive in the spectral range from 0.7 µm to 1.1 µm and has a maximum sensitivity close to the theoretical feasible sensitivity limits. The theoretically feasible sensitivity limit can be raised by using a light amplification by electron multiplication up to a factor of 1000 to the extent that individual photons can be reliably measured (photon counting mode).

It is especially advantageous if this sensor chip is a high-resolution chip and allows a high image tracking rate (for example, 35 images per second).

The respective high speed shutter of the camera is preferably designed so that the image sensor that goes with it can record a multitude of individual images in rapid sequence, preferably at a rate of 35 images per second, more preferably 120 images per second with reduced resolution. This rapid single image sequence makes it possible to use the camera according to the invention to scan a large search volume, i.e., to cover large viewing angles both horizontally and vertically in rapid sequence, so that the camera scans conducted in this way ensure a high reliability for detection of moving objects that emits light.

It is especially advantageous if at least one of the subarrays of optical elements has a Barlow lens set. Such a lens set makes it possible to achieve a high light transmittance and thus a high sensitivity with a long focal distance with a short length of the telescope at the same time.

In another preferred embodiment the camera has a filter arrangement consisting of multiple spectral filters, each of which can be moved into the beam path as needed, and the filter arrangement is preferably designed as a filter wheel. Such a filter arrangement in particular such a rapidly rotating filter wheel with three band filters, for example, covering the entire spectral range can create false color images sequentially of a moving object that emits light and heat, for example, a ship, after the filter has been moved into the beam path. At a high resolution of the camera at the same time, making it possible to image the light source, for example, the ship, in multiple pixels of the sensor, the images contain sufficient information about the shape, color and spectrum to permit identification of the object by comparison with sample images of known objects using a multispectral image analysis method. In the overall measured multispectral image, the position of an object being sought can be determined with pixel accuracy by correlation with a master image of the object being sought in the correct rotational position, and the object being sought may thus be discovered and identified in a search image.

It is especially advantageous if the camera system is also equipped for operation at night, using a target illumination device having a radiation source, preferably a laser diode radiation source or a high pressure xenon short arc lamp radiation source. Using such a target illumination device, an object that has been detected once can then be recognized even if the object itself is no longer emitting any light and/or heat radiation or is emitting only very minimal radiation as is the case with a ship at night, for example. This target illumination device, preferably formed by a near infrared laser diode target illumination device or a near infrared high pressure xenon arc lamp target illumination device illuminates the moving object once it has been detected and the camera receives the radiation from the target illumination device reflected by the illuminated moving object.

Target illumination using a narrow band laser diode target illumination device is especially advantageous when an existing broadband interference of haze, fog, dust or rain particles is competing with the narrow band target illumination. In this case, interference suppression factors of up to 25 can be achieved to advantage and thus much higher contrast images can be obtained than with other methods. In this way the usable visibility range can be increased significantly, for example, by a factor of 2 to 5 under corresponding visibility conditions.

The target illumination device can preferably be connected to the camera lens in such a way that the target illumination radiation emitted by the target illumination device can be moved into the beam path of the camera lens for bundling the radiation emitted. Such a target illumination device having a long focal distance makes it possible to generate a spot of light with the area of the target object at the target distance, i.e., in the area of the moving object, this spotlight being so large that it illuminates the target object but enough light is still reflected back to the image sensor of the camera system. The target illumination unit can include laser diodes in a cascade circuit and an optical fiber configured to output a beam.

It is especially advantageous if the camera lens has a mirror array for input of the target illumination radiation, this design being such that the beam path of the camera lens can be switched between the first image sensor and the target illumination device in synchronization with the emission of the illumination pulse and with the arrival of its echo pulse. In this so-called gated view operation, a radiation pulse generated by the target illumination device is sent through the camera lens to the target while the beam path to the respective image sensor is interrupted. The gating of this stroboscopic type of target illumination is selected so that the duration of each illumination pulse sent to the target is shorter than the time required to cover the distance from the camera system to the target object and back. The duration of each illumination pulse sent to the target is preferably at least 40%, in particular more than 60% of the time required for covering the distance from the camera system to the target object and back.

The radiation source of the target illumination device is preferably designed to emit pulsed flashes of light preferably in the infrared range, where the intensity of the infrared light pulses is preferably at least 0.7 kW, more preferably 5 kW. The energy bundling together with the high pulse power of approx. 5 kW in the ideal case emits enough near infrared light to illuminate an object at a distance of 20 km at night and through clouds that are not too thick and to do so brightly enough that the light reflected by the object is sufficient to still be detected by the sensor of the EMCCD camera with a signal-to-noise ratio of more than 1000.

The image analysis by multispectral image processing and multispectral image recognition is described below.

Figure 16:
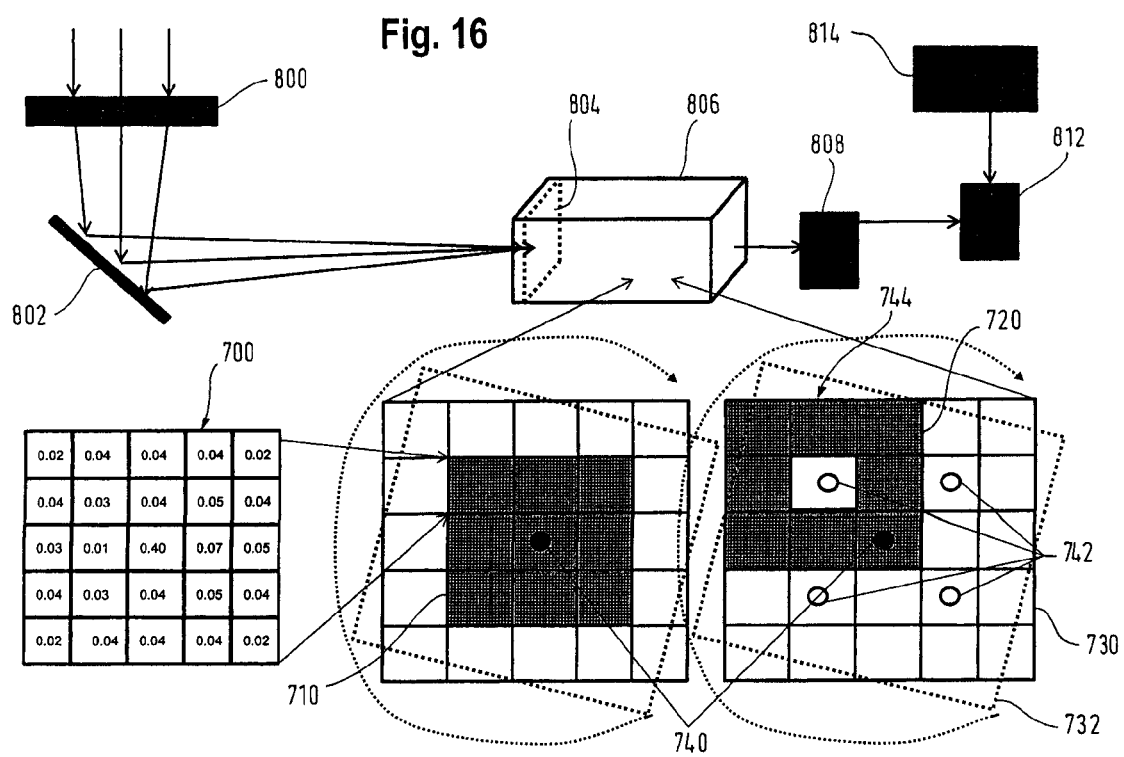
FIG. 16 shows a schematic diagram of a multispectral image recognition used in the system according to the invention.
Figure 17:
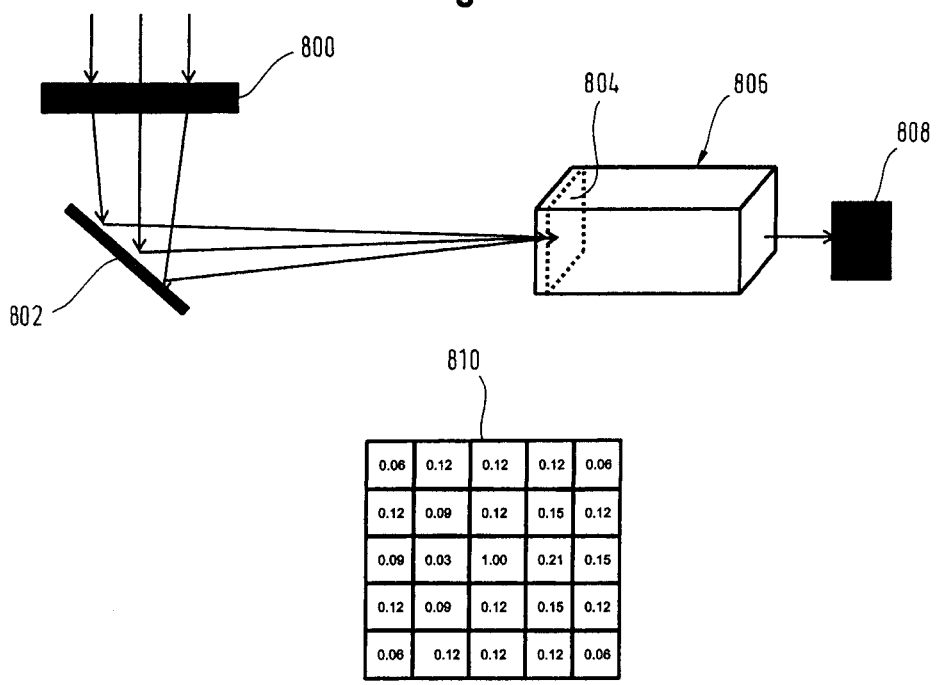
FIG. 17 shows a schematic diagram of a multispectral image processing by filtering used in the system according to the present invention.

The images recorded are advantageously processed using the multispectral image processing illustrated in FIG. 16 and the multispectral image recognition illustrated in FIG. 17, and the detected objects are transferred to the target object memory of the trafficking file processor 486 for further use.

The features of the multispectral image recognition are described below. An image object is not searched as an overall view and/or correlated but instead it is represented in the form of multiple characteristic details which can be described by a comparatively small feature vector with a high selectivity. These details are selected so that at least two details, normally three to four details, can be recognized reliably from any possible direction of observation, where increments of 45° intervals are accurate enough. For an image recorded perpendicularly from above it is sufficient to create as the signature a high resolution overall image of the target, optionally comprised of multiple partial images. This simplifies the creation and analysis of the signature database substantially in comparison with an oblique sighting of the target. Images of the characteristic details from all necessary angles of observation are created in a target image reference database and are saved with the required position data on the target object in the detail reference image. Data regarding where the target was encountered or might be encountered is also saved. If no direct images of the target are available, they can be generated by a computer graphic system with enough information about the target object. The resolution of the search image must then be converted, so that a sufficiently large number of readily recognizable characteristic details, preferably as unique as possible of the search object can be imaged on an image area of 25×25 pixels. To do so, several different resolutions can also be used and adapted to the respective detail size, and it is also possible to search first only for the detail in the coarsest resolution to accelerate the search. The feature vector of a detail is formed according to the invention from the characteristic data of small image areas each with a size of 5×5 pixels. Characteristic data here include the mean total brightness values weighted using the filter matrix 700 shown in FIG. 16 and the weighted mean standardized brightness values of the individual color components of the image areas. The individual image areas of 5×5 pixels are selected so that their feature vector is rotationally invariant, i.e., the same in all positions of rotation. This yields the computational advantage that the feature vector need be calculated only once for every 12 rotational positions used for the test. The overall detail is then imaged with a special arrangement of nine circular image areas 710 (circular within the context of the pixel resolution). This arrangement is supplemented by four ring-shaped image areas 720 (circular within the context of the pixel resolution) covering an image area 730 of 25×25 pixels. The positioning of the image subareas must be calculated separately for each rotational position 732 tested for the search image. Only 12 tested rotational positions, which are to be calculated by simple coordinate transformation of the partial image areas, are sufficient in a choice of partial image areas in the 25×25 pixel image field to unambiguously recognize a searched image in any rotational position by correlation of the reference image with the search image by means of the feature vectors and to determine the position and rotational position of the searched object and to unambiguously identify the image content of the object as an object of the same type as the tested reference image by correspondence of the feature vectors of the characteristic details.

The rotational position and location of the feature vector content of the reference image in relation to the search image with the concealed object having the smallest absolute value of the sum of the individual differential sums for the tested location in the section of the search image being tested currently and thus forms a definite local minimum of the absolute sum value in the tested image; this is evaluated as the recognized rotational position and location and as the recognized feature vector of the searched object in the search image.

The sections of the search image tested at a point in time must be selected in size so that two instances of the detail currently being searched cannot be included in one section because of geometric sizes and distance conditions plus the known properties of the reference target object.

In creating the reference target database, it is also necessary to first use artificially generated test images to test how low the minimum must be and/or which values the absolute sum amount must have for a correlation test to be reasonable.

It is especially advantageous if the images are recorded in two steps according to the following procedure in the case of night images created by the telescopic camera with artificial illumination with a poor signal-to-noise ratio:

Recording the images sequentially in partial images according to the gated view method, for example, at a distance of 20 km with a 13.333 μsec illumination time and following that, with a 13.333 μsec lighting time each as individual images of a single spectral color. Through the alternating operation glare due to stray objects such as dust or raindrops in the beam path near the camera is advantageously avoided and glare-free illumination over great distances of 20 km, for example, is made possible.

Adding up the partial images over 10 milliseconds to yield an overall composite image of one spectral color with less noise.

This composite image of one spectral color is processed as described below.

The telescope inlet lens 800 (FIG. 17) creates a real image of a remote target in the image plane 804 of an EMCCD NIR camera 806 by means of a deflecting mirror 802. This camera converts the optical image into a digital image that is saved in the form of an image file in a control computer 808 and which is then processed further digitally there. For this purpose, a two-dimensional filter having a coefficient matrix 810 as described with respect to FIG. 16 is used on all pixels of the image. This filter achieves a smoothing, edge sharpening and contrast improvement and also brightness improvement by a factor of 3 because of the weights used.

This filter advantageously achieves smoothing of the brightness curve, removing and smoothing noise pixels that stand out against the background, making the brightness curve steady and differentiable, improving image contrast and increasing the clarity of the colors in a multispectral image when the filter is used on all spectral components.

In the smoothed overall image of a spectral color, the position of an object being sought can be determined with pixel precision by correlation with a sample image of the object being sought in the correct rotational position, and the object being sought can thus be detected in a search image and identified. The measured relative position in the image can be entered into the tracking device of a fast automatic image stabilization unit, which then tracks the telescopic sighting access over a mechanically pivotable optical window, so that the found object retains its relative position in the image and advantageously there is no blurring of the image due to shaking or atmospheric turbulence.

The composite images of all additional spectral colors are advantageously recorded, shifted over one another and combined into a composite multispectral image of the target object consisting of an overall intensity image and the images of the standardized spectral color components.

In addition, an automatic multispectral image analysis unit is advantageously provided in the camera system, so that the image data of the images recorded by camera 806 are transmitted to this unit.

In the smoothed composite multispectral image supplied by the multispectral image analysis unit, the existence and precise position of an object being sought can advantageously be determined using an image recognition unit 812 (FIG. 16) with pixel precision by correlation of a reference or sample representation and/or a feature vector of the type of object being sought which is advantageously kept on hand in the unit for storing a sample database 814, with a representation and/or a feature vector of the search area currently being considered in the correct rotational position by testing for the best match.

To do so, the values that determine the filter function for the average pixel of the 5×5 pixel blocks are used as the feature vector for the image content of the 25×25 pixel block for an arrangement of a field of 25×25 pixels, which is especially suitable for this presentation and is obtained from an arrangement 730 of 25 blocks 700 each comprised of 5×5 pixels.

Then the pixel values calculated according to the two-dimensional matrix filter 810 and/or 700 presented above are calculated and the search multispectral image is compared with a sample multispectral image of the object being sought in the correct rotational position, the position having the best match is determined and the object being sought is very reliably detected and identified in a search image.

The pattern representation of a larger target object, for example, a ship will advantageously comprise multiple typical target details that must preferably be seen from above from all directions of observation. The target is considered to have been reliably identified when a sufficient number of unmistakable details have been recognized. Before the start of the image analysis the search image is converted to a pixel resolution in which all the selected search details can be represented in a grid field of 25×25 pixels.

A much more reliable target detection than with traditional methods, e.g., with neural networks and image pyramids is achieved through this extensive analysis of the multispectral information and a highly accurate pattern recognition of the representation of the target objects according to the invention.

The representation and/or the feature vector of the target image is advantageously formed in the manner described below.

The following characteristic values are calculated for the multispectral image recognition in the search image (25×25 pixel large) for each search pixel position 740:

1) The mean of the individual standardized spectral components, weighted according to the matrix 810, and the mean of the total brightness for each individual one of the nine marked 5×5 blocks 710 and for all four pixels 742 the average of the mean values for the eight 5×5 blocks arranged in a ring 744.

2) The standard deviation of the individual standardized spectral components and the total brightness for each of the nine marked 5×5 blocks 710 and for all four pixels 742, the average value of the standard deviations for the eight 5×5 blocks arranged in a ring 744.

3) The values according to 1) and 2) are calculated in 12 rotational positions distributed over 360°.

4) Each feature value set in each rotational position for this search pixel is compared by forming the difference with the feature values for the reference target image being sought, and the value set with the smallest absolute value of the differential sum and/or the smallest deviation is recorded as the representative for this search pixel.

5) The search image is then broken down into smaller subareas and the search pixel with the smallest differential sum is sought in each subarea. The value set of the search pixel with the smallest differential sum is interpreted as being a recognized target image and is registered as a discovered target of the reference target type at the search pixel position in question with a one pixel resolution and the rotational position.

By means of this image analysis unit, automatically detected objects can be recognized to advantage with sufficient resolution of the received images, as described, and if a known pattern is present these objects can be identified by comparison and/or correlation with sample images of known objects with a known identity.

For use of the multispectral camera as intended, the camera aircraft of the deployment group must advantageously be able to execute the following deployment procedure according to FIG. 11:

Continuous monitoring of the inner area C with a multispectral sensor unit with on-board artificial lighting with a large range (for example, more than 40 km) from a high altitude, for example, 13 km with a steep viewing angle by three multispectral sensor base aircraft 600, which fly in an arrangement such that the entire inner area is covered by the three sensors without a gap. The search region can assume the form of a linear barrier in the area near ground with a width of 80 km, for example, or in the standard tactic of the deployment group for each sensor, it may assume the form of a circular ring with a diameter of 80 km by day or 40 km diameter at night with artificial lighting and a sufficient depth to be able to reliably detect even small dinghies or vehicles passing by during the day and at night as well as when there is poor visibility due to haze, dust or rain and to do so at the search repetition frequency achieved.

Continuous tracking of the course, observation and identification of all ships or vehicles detected under the aforementioned visibility conditions in a region with a diameter of 80 km, for example, by day and 40 km at night by means of high resolution imaging near infrared sensors suitable for both day and nighttime use.

Mutual exchange of the search results of the radar and multispectral sensors within the deployment group and to the ground station 350 through the three data link base aircraft 500 and transmission of the control commands to the deployment group.

The imaging multispectral sensor and the subsequent multispectral image recognition also have the following advantages:

The multispectral sensor allows undetected daytime observation of ships from a location outside of the range of vision of the ship's crew with high resolution color images over great distances of 40 km, for example.

The multispectral sensor allows simultaneous and permanent surveillance of a large area with heavy ship traffic, for example, with 50 to 100 ships within a diameter of 40 km.

The multispectral sensor allows undetected nighttime surveillance of ships using an illumination that is invisible for the human eye and for night vision devices and to do from a location outside of the viewing range of the ship's crew with high resolution colored images over great distances of 20 km, for example.

The multispectral sensor allows simultaneous and permanent nighttime surveillance of a large region with heavy ship traffic, for example, with 30 to 50 ships within a diameter of 20 km.

The multispectral sensor allows undetected daytime surveillance of ships from a location outside of the viewing range of the ship's crew by day even with poor visibility due to haze, dust or raindrops in the air, yielding high resolution color images over great distances of 20 km, for example.

The multispectral sensor allows simultaneous and permanent daytime surveillance of a large region with heavy ship traffic, for example, with 30 to 50 ships within a diameter of 20 km, even with poor visibility due to haze, dust or raindrops in the air.

The multispectral sensor allows undetected nighttime surveillance of ships from a location outside of the viewing range of the ship's crew and with poor visibility due to haze, dust or raindrops in the air, yielding high-resolution color images over great distances of 15 km, for example.

The multispectral sensor allows simultaneous and permanent daytime surveillance of a large region with heavy ship traffic, for example, with 20 to 40 ships within a diameter of 15 km, even under poor visibility due to haze, dust or raindrops in the air.

With the ranges mentioned above, ships can be identified by day and at night and possible preparations for attacks or raids by pirates can be detected promptly to be able to effectively defend against raids using armed slave aircraft:

Using the observation data from all multispectral sensors in the region, a target ship reference database can advantageously be created and updated regularly, so that after a period of operation, it would include practically all ships that traffic in the region to be protected. This target ship reference database will be created and updated in the grounds control station.

The ground control stations will advantageously in turn send the sample images of the ships currently being expected in their area to all multispectral sensor stations or messages may be sent by radar and radio and thus facilitate the image analysis on board the aircraft.

Reference numerals in the claims, the description and the drawings are used only to facilitate an understanding of the invention and should in no way restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air-to-surface surveillance or weapons system, comprising:
    a base aircraft with a fuselage carrying at least one wing, wherein a nose portion of the fuselage includes surveillance and monitoring equipment; and
    an unmanned slave aircraft with a fuselage carrying a first wing, wherein the slave aircraft is equipped with monitoring equipment or a weapon,
    wherein the base aircraft and the unmanned slave aircraft each include a respective coupling mechanism that is configured so that the base aircraft and unmanned slave aircraft can be coupled and uncoupled from each other,
    wherein the slave aircraft is configured to be connected to a control station via a data link for data exchange and configured to be controlled from the control station,
    wherein the slave aircraft includes a drive unit, which comprises
        a plurality of wing assemblies arranged one above the other, the wing ends being connected to one another by side walls that are curved above a longitudinal axis forming a box-like construction that is closed at the sides, said box-like construction being provided with at least two laterally arranged tubular members, each being open on a front side and a rear side, the front side having a propeller driven by an electric motor.

2. The air-to-surface surveillance or weapons system according to claim 1, wherein the base aircraft is also unmanned and can be connected via another data link to the control station and can be controlled from the control station.

3. The air-to-surface surveillance or weapons system according to claim 1, wherein
    the at least one wing of the base aircraft or the first wing of the slave aircraft
        is configured to generate an aerodynamic buoyancy, and
        has a plurality of wing spars extending in a crosswise direction and at a right angle to a longitudinal axis of the fuselage, and has tubes surrounded by a skin forming a wing cover that defines a cross-sectional contour of the wing, wherein the cross-sectional contour is configured as a laminar profile that creates a high buoyancy at a low flow resistance.

4. The air-to-surface surveillance or weapons system according to claim 3, wherein at least some of the tubes in the at least one wing are filled with hydrogen and other of the tubes are filled with oxygen.

5. The air-to-surface surveillance or weapons system according to claim 3, wherein the fuselage of at least one of the base aircraft and slave aircraft has a shell at least partially filled with hydrogen gas.

6. The air-to-surface surveillance or weapons system according to claim 3, wherein the base aircraft has a propeller and an electrically driven drive motor, which is arranged in an engine pod provided beneath the fuselage or on the wing.

7. The air-to-surface surveillance or weapons system according to claim 3, wherein the skin of the wing cover is transparent on a top side of the wing and the top side of the wing is equipped with solar cells of a solar generator arranged between the transparent skin and the tubes.

8. The air-to-surface surveillance or weapons system according to claim 1, wherein the base aircraft includes a photovoltaic power supply unit configured to generate drive energy, the photovoltaic power supply unit comprising
    at least one photovoltaic solar generator configured to convert incident radiant solar energy into electric energy;
    at least one hydrogen generator configured to generate hydrogen from water;
    at least one hydrogen storage tank connected to the hydrogen generator by a first water line;
    at least one hydrogen storage tank with a first chamber, the at least one hydrogen storage tank is connected to the hydrogen generator by a first hydrogen line;
    at least one fuel cell connected via a second hydrogen line to the hydrogen storage tank and connected via a second water line to the water storage tank; and
    a control unit electrically connected to the solar generator, the hydrogen generator and the fuel cell.

9. The air-to-surface surveillance or weapons system according to claim 8, wherein the control unit is configured so that in presence of the radiant solar energy, the control unit sends the electric energy generated by the solar generator to an electric consumer connection of the power supply unit, and in absence of radiant solar energy or when the electric energy generated by the solar generator is not sufficient for a given energy demand, the control unit activates the fuel cell to supply electric energy to the consumer connection.

10. The air-to-surface surveillance or weapons system according to claim 9, wherein the control unit is configured so that in the presence of radiant solar energy, the control unit sends a portion of the electric energy generated by the solar generator to the hydrogen generator; and the control unit sends the hydrogen generator water from the water storage tank, so that the hydrogen generator is activated to generate hydrogen from the water supplied to it so the hydrogen is stored in the hydrogen storage tank.

11. The air-to-surface surveillance or weapons system according to claim 1, wherein the coupling mechanisms of the base aircraft and the slave aircraft include a refueling connection with which fuel can be supplied from the base aircraft to the slave aircraft.

12. The air-to-surface surveillance or weapons system according to claim 1, wherein the slave aircraft is provided with buoyancy elements filled with a gas lighter than air so that the slave aircraft is capable of hovering.

13. The air-to-surface surveillance or weapons system according to claim 12, wherein the gas that is lighter than air is hydrogen, which is stored in at least hydrogen storage tank of the slave aircraft and is also provided as a fuel for an aircraft drive.

14. The air-to-surface surveillance or weapons system according to claim 1, wherein the plurality of wing assemblies of the drive unit of the slave aircraft each comprises a horizontal rudder flap and a vertical rudder flap, which are controllable independently of each other so as to allow the slave aircraft to perform vertical takeoff and landing.

15. The air-to-surface surveillance or weapons system according to claim 1, wherein the base aircraft has at least one observational radar unit aimed downward at earth's surface.

16. The air-to-surface surveillance or weapons system according to claim 1, wherein the base aircraft has at least one radar altimeter directly downward at earth's surface.

17. The air-to-surface surveillance or weapons system according to claim 1, wherein the base aircraft has at least one telescopic camera directed downward at earth's surface and a target object illumination unit assigned to the at least one telescopic camera.

18. The air-to-surface surveillance or weapons system according to claim 1, wherein the base aircraft includes at least one telescope CCD camera directed downward at earth's surface, the telescope CCD camera configured to enhance light using electron multiplication; and a target object illumination unit assigned to the telescope CCD camera, the target object illumination unit including laser diodes in a cascade circuit and an optical fiber configured to output a beam.

19. The air-to-surface surveillance or weapons system according to claim 1, wherein the drive unit further comprises curved side walls that connect together the plurality of wing assemblies to form a box-like construction that is closed on sides of the drive unit so that air flows from the front side to the rear side of the at least two tubular chambers.

20. The air-to-surface surveillance or weapons system according to claim 1, wherein the at least two laterally arranged tubular chambers comprise four laterally arranged tubular chambers and the plurality of wing assemblies comprise three wing assemblies.

* * * * *